US008089061B2

(12) United States Patent
Kobayashi et al.

(10) Patent No.: US 8,089,061 B2
(45) Date of Patent: Jan. 3, 2012

(54) QUANTUM DOT INORGANIC ELECTROLUMINESCENT DEVICE

(75) Inventors: Satoshi Kobayashi, Tokyo (JP); Yuki Iguchi, Tachikawa (JP)

(73) Assignee: Hoya Corporation, Tokyo (JP)

( * ) Notice: Subject to any disclaimer, the term of this patent is extended or adjusted under 35 U.S.C. 154(b) by 142 days.

(21) Appl. No.: 12/227,932

(22) PCT Filed: Jun. 4, 2007

(86) PCT No.: PCT/JP2007/061314
§ 371 (c)(1),
(2), (4) Date: Dec. 3, 2008

(87) PCT Pub. No.: WO2007/142203
PCT Pub. Date: Dec. 13, 2007

(65) Prior Publication Data
US 2009/0242871 A1 Oct. 1, 2009

(30) Foreign Application Priority Data

Jun. 5, 2006 (JP) ................................. 2006-156719

(51) Int. Cl.
*H01L 33/00* (2010.01)
(52) U.S. Cl. .................... 257/13; 257/40; 257/E33.008; 977/774; 977/950
(58) Field of Classification Search .................... 257/13, 257/40, E33.008; 977/774, 950
See application file for complete search history.

(56) References Cited

U.S. PATENT DOCUMENTS

| 2003/0042850 A1 | 3/2003 | Bertram et al. |
| 2003/0043630 A1* | 3/2003 | Forbes et al. ............ 365/185.26 |
| 2009/0093105 A1* | 4/2009 | Kobayashi et al. ........... 438/478 |

FOREIGN PATENT DOCUMENTS

| JP | A-2003-173878 | 6/2003 |
| JP | A-2003-249373 | 9/2003 |
| JP | A-2005-502176 | 1/2005 |
| JP | A-2005-514744 | 5/2005 |
| JP | A-2006-004658 | 1/2006 |
| JP | A-2007-095685 | 4/2007 |
| WO | WO 03/058728 A1 | 7/2003 |
| WO | WO 2006/043656 A1 | 4/2006 |

OTHER PUBLICATIONS

Heine et al., "Synthesis of CdSe quantum dot-ZnS matrix thin films via electrospray organometallic chemical vapor deposition," *Journal of Crystal Growth*, vol. 195, pp. 564-568, 1998.
Tang et al., "Organic electroluminescent diodes," *Applied Physics Letters*, vol. 51, No. 12, pp. 913-915, Sep. 21, 1987.

(Continued)

*Primary Examiner* — Victor A Mandala
*Assistant Examiner* — Whitney T Moore
(74) *Attorney, Agent, or Firm* — Oliff & Berridge, PLC

(57) ABSTRACT

An inorganic EL device is provided with a substrate, a first electrode, a first insulating layer, a light emitting layer, a second insulating layer and a second electrode. The inorganic EL light emitting device is characterized in that the light emitting layer contains a quantum dot and is arranged between the first insulating layer and the second insulating layer by being brought into contact with each of the insulating layers.

11 Claims, 14 Drawing Sheets

OTHER PUBLICATIONS

Braun et al., "Visible light emission from semiconducting polymer diodes," *Applied Physics Letters*, vol. 58, No. 18, pp. 1982-1984, May 6, 1991.

Adachi et al., "Organic electroluminescent device having a hole conductor as an emitting layer," *Applied Physics Letters*, vol. 55, No. 15, pp. 1489-1491, Oct. 9, 1989.

Colvin et al., "Light-emitting diodes made from cadmium selenide nanocrystals and a semiconducting polymer," *Nature*, vol. 370, pp. 354-356, Aug. 4, 1994.

Dabbousi et al., "Electroluminescence from CdSe quantum-dot/polymer composites," *Applied Physics Letters*, vol. 66, No. 11, pp. 1316-1318, Mar. 13, 1995.

Schlamp et al., "Improved efficiencies in light emitting diodes made with CdSe(CdS) core/shell type nanocrystals and a semiconducting polymer," *Journal of Applied Physics*, vol. 82, No. 11, pp. 5837-5842, Dec. 1, 1997.

Mattoussi et al., "Electroluminescence from heterostructures of poly(phenylene vinylene) and inorganic CdSe nanocrystals," *Journal of Applied Physics*, vol. 83, No. 12, pp. 7965-7974, Jun. 15, 1998.

Coe et al., "Electroluminescence from single monolayers of nanocrystals in molecular organic devices," *Nature*, vol. 420, pp. 800-803, Dec. 2002.

Yang et al., "Photoluminescent and electroluminescent properties of Mn-doped ZnS nanocrystals," *Journal of Applied Physics*, vol. 93, No. 1, pp. 586-592, Jan. 1, 2003.

Hikmet et al., "Study of conduction mechanism and electroluminescence in CdSe/ZnS quantum dot composites," *Journal of Applied Physics*, vol. 93, No. 6, pp. 3509-3514, Mar. 15, 2003.

Bakueva et al., "Luminescence from processible quantum dot-polymer light emitters 1100-1600 nm: Tailoring spectral width and shape," *Applied Physics Letters*, vol. 84, No. 18, pp. 3459-3461, May 3, 2004.

O'Connor et al., "Near-infrared electroluminescent devices based on colloidal HgTe quantum dot arrays," *Applied Physics Letters*, vol. 86, pp. 201114-1-201114-3, 2005.

Kamath et al., "Room-temperature operation of $In_{0.4}Ga_{0.6}As$/GaAs self-organised quantum dot lasers," *Electronics Letters*, vol. 32, No. 15, pp. 1374-1375, Jul. 18, 1996.

Huffaker et al., "1.3 µm room-temperature GaAs-based quantum-dot laser," *Applied Physics Letters*, vol. 73, No. 18, pp. 2564-2566, Nov. 2, 1998.

Kirstaedter et al., "Gain and differential gain of single layer InAs/GaAs quantum dot injection lasers," *Applied Physics Letters*, vol. 69, No. 9, pp. 1226-1228, Aug. 26, 1996.

Apetz et al., "Photoluminescence and electroluminescence of SiGe dots fabricated by island growth," *Applied Physics Letters*, vol. 66, No. 4, pp. 445-447, Jan. 23, 1995.

Chang et al., "Room-temperature electroluminescence at 1.3 and 1.5 µm from Ge/Si self-assembled quantum dots," *Applied Physics Letters*, vol. 83, No. 14, pp. 2958-2960, Oct. 6, 2003.

Hatami et al., "Red light-emitting diodes based on InP/GaP quantum dots," *Journal of Applied Physics*, vol. 97, pp. 096106-1-096106-3, 2005.

Mikami et al., "Aging characteristics of ZnS:Mn electroluminescent films grown by a chemical vapor deposition technique," *Journal of Applied Physics*, vol. 72, No. 2, pp. 773-782, Jul. 15, 1992.

Venghaus et al., "Microstructure and light emission of ac-thin film electroluminescent devices," *Journal of Applied Physics*, vol. 53, No. 6, pp. 4146-4151, Jun. 1982.

Xin et al., "Effect of annealing on the grain growth and luminescent properties of SrS:Cu blue phosphors," *Journal of Applied Physics*, vol. 85, No. 8, pp. 3999-4002, Apr. 15, 1999.

Manzoor et al., "Multicolor electroluminescent devices using doped ZnS nanocrystals," *Applied Physics Letters*, vol. 84, No. 2, pp. 284-286, Jan. 12, 2004.

Danek et al., "Electrospray organometallic chemical vapor deposition-A novel technique for preparation of II-VI quantum dot composites," *Applied Physics Letters*, vol. 65, No. 22, pp. 2795-2797, Nov. 28, 1994.

Victor I. Klimov, "Semiconductor and Metal Nanocrystals," *Marcel Dekker*, Inc., pp. 1-15 and 60-63, 2004.

* cited by examiner

QUANTUM DOT INORGANIC ELECTROLUMINESCENT DEVICE

TECHNICAL FIELD

This invention relates to an inorganic EL (electroluminescent) light emitting device. More particularly, it relates to a light emitting device having a light emitting layer containing quantum dots in an inorganic material.

BACKGROUND ART

In recent years, inorganic semiconductor nanocrystals whose size and shape dispersion are very small have been able to be prepared as a colloidal dispersion in solvent. Monodisperse semiconductor fine crystals having a size of about several nanometers are precipitated from a solution phase and so-called "semiconductor quantum dots" are obtained in the form of a colloidally dispersed solution thereof. In most cases, the surface of a semiconductor fine crystal, which is regarded as a singe crystal, is terminated with organic molecule ligands to provide a semiconductor nanocrystal as a quantum well, thereby forming a three-dimensional quantum well (quantum dot) wherein the organic ligand and solvent serve as a potential barrier. Alternatively, the semiconductor nanocrystal (corresponding to core) is surrounded thereabout with a wide-gap semiconductor layer (corresponding to a shell) to form so-called "type I quantum well structure." Where the size of the semiconductor fine crystal is sufficiently smaller than the Bohr radii of the electron and hole within the semiconductor, the crystal is surrounded thereabout with a potential barrier having a satisfactory height and thickness, thereby enabling discrete quantized levels to be formed. When a transition probability toward the outside of the semiconductor becomes small, the electron and hole excited to the quantized levels are mutually re-combined, so that photoluminescence is very efficiently emitted even at room temperature. Especially, it has been found that within quantum dots constituted of CdSe, CdS, PbSe, HgTe, CdTe, InP, GaP, InGaP, GaAs, InGaN, GaN or the like, or a mixed crystal thereof, the Wannier-Mott exciton wherein a confined electron and hole mutually form a bound state to form a hydrogen type orbit stably exists at room temperature in a nanocrystal having a diameter of about 2 to 6 nm. In this case, the exciton is confined in a space much smaller than the Bohr radius in free states and thus, the binding energy becomes drastically large. By acquiring such a binding energy that is adequately larger than a thermal energy in a room temperature environment, the dot functions as a radiative center stably in a high efficiency during the course of light emission.

During several years in the past, there have been proposed devices incorporating an organic polymer matrix and inorganic semiconductor nanocrystals into a structure analogous to a direct current drive diode using an organic phosphor, such as aluminium quinolinol ($Alq_3$) or the like as a light emitting material, i.e. an organic electroluminescent (EL) device (OLED) (Non-Patent Documents 1 to 3) wherein using the affinity of molecular orbit levels, carrier injection, and transport and light emission are carried out, and light emission phenomena thereof have been reported (Non-Patent Documents 4 to 12).

Patent Document 1: WO2006/043656
Patent Document 2: Japanese Patent Laid-open No. 2003-173878
Patent Document 3: Japanese Patent Laid-open No. 2003-249373

Non-Patent Document 1: C. W. Tang and S. A. VanSlyke, Appl. Phys. Lett. 51, 913 (1987)
Non-Patent Document 2: D. Braun and A. J. Heeger, Appl. Phys. Lett. 58, 1982 (1991)
Non-Patent Document 3: C. Adachi, et al., Appl. Phys. Lett. 55, 1489 (1989)
Non-Patent Document 4: V. L. Colvin, et al., Nature 370, 354 (1994)
Non-Patent Document 5: B. O. Dabbousi, et al., Appl. Phys. Lett. 66, 1316 (1995)
Non-Patent Document 6: M. C. Schlamp, et al., J. Appl. Phys. 82, 5837 (1997)
Non-Patent Document 7: H. Mattoussi, et al., J. Appl. Phys. 83, 7965 (1998)
Non-Patent Document 8: S. Coe, et al., Nature 420, 800 (2002)
Non-Patent Document 9: Heesun Yang, et al., J. Appl. Phys. 93, 586 (2003)
Non-Patent Document 10: R. A. M. Hikmet, et al., J. Appl. Phys. 93, 3509 (2003)
Non-Patent Document 11: L. Bakueva, et al., Appl. Phys. Lett. 84, 3459 (2004)
Non-Patent Document 12: E. O'Connor, et al., Appl. Phys. Lett. 86, 201114 (2005)
Non-Patent Document 13: K. Kamath, et al., Electron. Lett. 32, 1374 (1996)
Non-Patent Document 14: D. L. Huffaker, et al., Appl. Phys. Lett. 73, 2564 (1998)
Non-Patent Document 15: N. Kirstaedter, et al., Appl. Phys. Lett. 69, 1226 (1996)
Non-Patent Document 16: R. Apetz, et al., Appl. Phys. Lett. 66, 445 (1995)
Non-Patent Document 17: W.-H. Chang, et al., Appl. Phys. Lett. 83, 2958 (2003)
Non-Patent Document 18: F. Hatami, et al., J. Appl. Phys. 97, 96106 (2005)
Non-Patent Document 19: Akiyoshi Mikami, et al., J. Appl. Phys. 72, 773 (1992)
Non-Patent Document 20: H. Venghaus, et al., J. Appl. Phys. 53, 4146 (1982)
Non-Patent Document 21: Y. B. Xin, et al., J. Appl. Phys. 85, 3999 (1999)
Non-Patent Document 22: K. Manzoor, et al., Appl. Phys. Lett. 84, 284 (2004)
Non-Patent Document 23: M. Danek, et al., Appl. Phys. Lett. 65, 2795 (1994)
Non-Patent Document 24: Victor I. Klimov, "Semiconductor and Metal Nanocrystals", pp. 8, (Marcel Dekker, Inc., 2004)

DISCLOSURE OF THE INVENTION

Problem to be Solved by the Invention

As a matter of course, when using a quantum dot material having luminous characteristics of such a high efficiency as an emissive material of a light-emitting device, not only a high EL efficiency is expected, but also its use as a component of a high-efficient electric emission device having higher durability, reliability and environmental resistance than OLED is expected because of the inorganic materials thereof. However, so far as devices of an emission-by-carrier-injection type using quantum dots formed by wet processes as an active material for emission recombination are concerned, it has been hitherto reported that effective EL characteristics are shown only from emission devices using organic matters such as polymers as a carrier transport material. Thus, it will be apparent that the durability and the like of these devices are limited by those organic materials.

More particularly, it may considered as other option for constituting a solid electronic device using such a nanocrystal as an emission active member and having high durability, reliability and environmental resistance that carrier injection is performed by use of band edge conduction of an inorganic material from the standpoints of much higher mobility and a much lower degree of material degradation.

Many arrangements of emission devices using quantum dots as an emission active material without resorting to such a wet chemical synthetic technique as mentioned above have been hitherto attempted. As a typical device, there are known devices wherein Stranski-Krastanov type quantum dots formed on a single crystal substrate using a self-assembly process using the mismatch of crystal lattice constants (Non-Patent Documents 13 to 18). These devices develop luminescence from obvious quantized levels. Although the luminescence efficiency itself is lower than that of quantum dots formed according to a wet process, light-emitting diodes capable of operating even at room temperature have been recently reported. However, when application to a flat panel display or indicator is taken into account, it is apparently difficult to deposit monodisperse dots on a large-area polycrystalline underlying material such as indium tin oxide (ITO) or the like. Moreover, with application to a small-area substrate, limitation is placed on a well depth from the selectivity of a well material (corresponding to a core) and a barrier material (corresponding to a shell), resulting in a strong limit on emission color.

In general, light-emitting diodes are required to have a stack structure having such junctions of hole conductive layer/emission active layer/electron conductive layer as to carry out barrierless carrier injection from the electrode to then emission-active site. Especially, it is known that positive and negative carrier injection into a so-called wide gap emission active material needs some approach to permit a potential barrier not to be formed as much as possible either by using a high (or low) work function material as an electrode or by providing an graded structure provided between an electrode and a carrier transport layer.

In a device using a quantum well structure as an emission active region, similar characteristics are required. More particularly, there is needed a structure whose conductive levels are smooth continuous by providing a structure wherein holes and electrons both develop a barrierless band edge state against and arrive at a material functioning as a potential barrier of a quantum well, or by intentionally forming a sub-band state for transition to quantized levels in the well. This requirement simultaneously means the necessity of suppressing a density of defect, which act as a carrier capture state, to a very low value over a whole region of the stack structure. However, in applications to devices for light-emitting flat displays, individual component member layers in a diode structure invariably become polycrystalline or amorphous in nature, so that it is inevitable to form high-density boundary states, intraband state or tail states. Thus, not only a difficulty is involved in making a high (or low) work function electrode, but also matching of band structure is one of difficult.

On the other hand, so-called double-insulating-type inorganic electroluminescent devices and allied devices of an AC driven type, which are operated by application of AC are light emitting devices capable of widely covering a visible light region or a infrared or ultraviolet region depending on the radiative states of a phosphor used. In operation, no carrier injection from a metal or transparent conductive oxide electrode is necessary with the merit that drive is possible only by an strong electric field induced by application of an alternating current between the electrodes. With both of so-called thin film type and powder type, this is explained by use of a fundamental model wherein electrons accelerated by means of an strong electric field in a conduction band of semiconductor collide with and excite emission centers along with carrier multiplication. By the way, it is known that with existing AC drive inorganic EL devices based on this working principle, a space (or distance) capable of adequately accelerating electrons in the course of the excitation of the light-emission centers is necessary, for which as the size of a semiconductor crystallite is reduced from several hundreds of nanometers or approximately 1 micrometer to smaller size, the emission intensity abruptly reduces relative for a drive voltage of about AC 100 V (Non-Patent Documents 19 to 21). Accordingly, if an active layer having a quantum dot structure consisting of nanocrystals is applied to an ordinary inorganic EL device as it is, effective light emission cannot be expected and in fact, no emission is obtained (even if a velocity distribution of electrons is taken into consideration).

A example of a workable EL device using an active layer formed by spray coating a dispersion solution of ZnS nanocrystals doped with $Cu^+$ and $Al^{3+}$ or $Cu^+$, $Al^3$ and $Mn^{2+}$ has been reported (Non-Patent Document 22). In this case, an origin of light emission resides in transition between interband states formed by the impurities doped in the nanocrystals, i.e. transition between so-called donor and acceptor levels, and is nothing to do with light emission between confined intra quantized states formed "in a quantum dot" according to a quantum size effect.

As is widely known in the art, a diversity of mechanisms exist with respect to the formation and transport of electrons and holes inside a semiconductor or at a junction interface. With conventional inorganic EL device structures, an light-emission mechanism, which is attained by recombination of electrons and holes at impurity levels through accelerated injection of electrons from a semiconductor interface level, excitation by collision of the electrons, and multiplication of electrons and holes by application of an electric field, is specialized for optimization of the light-emission characteristics. Nevertheless, we have made studies on dimensions, processes, drive methods and the like different from the known one. We have already proposed (Patent Document 1) a technique wherein an ion source having an ionization setup using an electrospray ionization phenomenon or an atmospheric pressure ionization phenomenon is used to form an ion formed of a semiconductor nanocrystal alone directly from a nanocrystal dispersion according to wet chemical synthetic technique, separate from a solvent and a ligand molecule, and transport the nanocrystal on a substrate as a beam for deposition.

Measure for Solving the Problem

We realize the formation of electrons and holes in a double insulation structure diode, in which an light-emission active layer including a quantum dot structure is sandwiched between carrier barrier layers, by application of a strong electric field and make it possible to perform recombinative light-emission via quantized states in quantum dots. As a consequence, it has been first for a light-emitting device using so-called quantum dots as a recombinative light-emission member formed by the wet chemical synthetic technique to enable operations of a totally inorganic electroluminescent device.

In accordance with the invention, there is fabricated a double insulation (MISIM) type, all-inorganic electroluminescent (EL) device using, as a starting material for emission active layer (light-emission layer), a nanocrystal having a narrow gap semiconductor/wide gap semiconductor-spherical core/shell structure formed by a wet chemical synthetic technique, i.e. a colloidal dispersion of so-called "quantum dot," thus succeeding first in emission of monochromatic narrow spectrum EL wherein a quantized state of three-dimensional confinement is originated.

As a typical example, there was formed a three-dimensional quantum well structure wherein an emission active layer was formed according to our own original technique of electrospray ion beam direct deposition (ES-IBD) method using a nanocrystal dispersion of CdSe/ZnS core/shell as a starting material. From the thus fabricated EL device, there was obtained visible EL having red-blue peaks according to the size of the core crystal in the dispersion used. These spectra were substantially the identical to photoluminescence (PL) spectra of the "quantum dot" dispersion and device per se other than slight redshift components.

In the practice of the invention, semiconductor quantum dots prepared by a wet chemical synthetic technique are used as material for quantum dot. The semiconductor nanocrystals (quantum dots) prepared by the wet chemical synthetic technique are terminated on the semiconductor surface with ligand molecules and is stably dispersed in a solvent in a colloidal form.

We have confirmed that while applying this as a starting material (initial state) by a conventionally employed technique such as a spin coating method, a printing method, a dipping method (dipping), a spraying method or the like or after the application, treatments such as drying, heating, oxidation, UV light irradiation, exposure to plasma and the like are carried out for the purposes of removing the solvent and/or the surface ligand molecules, whereupon the photoluminescence intensity from the semiconductor nanocrystals (quantum dots) is extremely reduced. This is considered for a characteristic PL quenching phenomenon occurring in such a way that when organics are desorbed from a coated body whose degree of thermal equilibrium is relaxed to a high level, surface states or defect states occurs at high density in the nanocrystal surface or an outside thereof, for which a probability of transition and deactivation of electrons and holes, which should be confined in the quantum well, extremely increases. In prior art, there has never been a technique, in which daringly remove the organic matters for an essential process factor.

Under these circumstances, it has been found for the first time that when using a manufacturing method proposed herein wherein while keeping a quantum dot structure, a state of not deactivating PL intensity can be formed while removing substantially all of organic matters by use of a deposition method wherein a degree of thermal non-equilibrium is high, a quantum dot emission active layer, that is free of carbon, carbon compounds and organic matters is needed for quantum dot light-emission-type inorganic EL devices.

In order to confirm an amount of organic matters removed from or remained in the light-emission layer, it is proper to measure a ratio between carbon and constituent elements of a quantum dot in the light-emission layer. For instance, for a CdSe/ZnS quantum dot, a ratio of $N_C/N_{Cd}$ wherein $N_C$ is the number of carbon atoms and $N_{Cd}$ is the number of cadmium atoms is measured. The state where $N_C/N_{Cd}$ is at 0 (zero) indicates that organic matters are completely removed. In the practice of the invention, quantum dots are deposited by use of an electrospray-ion beam deposition method. Where the resulting deposition film has a ratio of $N_C/N_{Cd}$ ranging from 0.0001 to 10, EL emission has been observed. Since well of the quantum dot, i.e. core, is constituted of stoichiometric CdSe crystal, it has been found for the first time that a ratio of the number of carbon atoms $N_c$ to the number of quantum dot constituent atoms $N_{QD}$, i.e. a ratio of $N_C/N_{QD}$, at which EL emission can be realized, is in the range of from 0.00005 to 5. It will be noted that $N_C/N_{cd}$ was measured by secondary ion-microprobe mass spectrometry (SIMS), X-ray photoelectron spectroscopy (XPS or ESCA), ICP-emission analysis, mass analysis or the like.

The emission device of the invention involves no deactivation of luminescence from a quantized state level even in a state where organic matters have been removed. Accordingly, the thickness of the emission layer can be made much thinner (about 50 to 100 nm) than that of prior art. Moreover, because the degree of thermal non-equilibrium in the deposition technique is high, the substrate temperature during the process can be suppressed very low.

In prior art, a configuration similar to the light-emitting device of the invention has been disclosed (Patent Documents 2 and 3). In Patent Document 2, such a configuration is described wherein fine particles of a light-emitting material contained in an emission layer is sandwiched merely between intermediate layers or dispersed in a matrix, each made of a material having a band gap wider than the light-emitting material. The emission layer used herein is formed by spin coating or the like as is particularly described in the Document, so that no chemical bond between the fine particles and the intermediate layer is formed as is widely known. In Patent Document 3, it is described that fine particles of a semiconductor as an emission center are dispersed in a continuous phase of the semiconductor. Although fine particles of a semiconductor having a shell layer are also set out, the fine particles of the semiconductor having a core/shell structure is likewise dispersed only in the continuous phase of the semiconductor. As is explicitly stated in the respective Documents, the fine particles of semiconductor are only kept as being merely in a dispersed state in these prior-art techniques.

As disclosed in Non-Patent Document 23, in case where a quantum dot structure wherein fine crystals of a core are formed in a crystalline matrix can be formed, it is known that photoluminescent characteristics degrade if defects exist in the matrix crystal. As a matter of course, the degree of degradation of electroluminescence becomes more considerable. In addition, even with the case of quantum dots having a core/shell structure as disclosed in Non-Patent Document 24, it is widely known that if the shell surface is not passivated, a good emission efficiency cannot be realized. In other words, in order to attain a high luminescent efficiency by use of a film having a semiconductor quantum dot structure as an emission active member, it is essential that while keeping the continuity of crystal about a perfect crystal core or a quantum well semiconductor, it be covered with a defect-free shell or quantum well wall semiconductor, followed by passivation on the surfaces thereof. In prior art, however, no technology for realizing this is known and the fact is that in order to realize the passivation, a modifying molecule used to impart surface activity in a solution is kept as left or an organic matter is used as a matrix, or a merely dispersed state has to be formed with a sacrifice of passivation. According to the invention, it has succeeded for the first time that quantum dots per se are made in a thermal non-equilibrium state and while keeping a three-dimensional quantum well structure that is essential of quantum dot, the surface modifying molecule of the quantum dot is desorbed so that the shell surface of individual quantum dots having a core/shell structure or the shell surface and a matrix are chemically bonded with each other (i.e. passivated) thereby providing a polycrystal whose emission efficiency is very high.

The embodiments of the invention are described below.

EMBODIMENT 1

An inorganic electroluminescent (EL) device including a substrate, and a first electrode, at least one insulating layer, an (light-)emission layer, and a second electrode, wherein the emission layer contains a quantum dot (QD) and carbon (C) and a ratio ($N_C/N_{QD}$) between the number of carbon atoms ($N_C$) and the number of quantum dot constituent atoms ($N_{QD}$) ranges from 0.00005 to 5, and the emission layer is provided in contact with the insulating layer.

The substrate may be selected from flexible substrates. A double insulation-type inorganic EL device is more excellent in symmetry relative to polarity upon application of an alternating current, so that it is preferred that the inorganic EL device has a first insulating layer and a second insulating layer, and the emission layer is provided between the first insulating layer and the second insulating layer.

EMBODIMENT 2

The quantum dot (emission-type) inorganic EL device as recited in Embodiment 1, wherein a solution of quantum dots modified with an organic compound on the surface thereof and dispersed in a solvent is used as a starting material for the quantum dot.

EMBODIMENT 3

An inorganic electroluminescent (EL) device including a substrate, and a first electrode, at least one insulating layer, an (light-)emission layer, and a second electrode, wherein the emission layer contains quantum dots formed by using, as a starting material, a solution of quantum dots modified on the surface thereof with an organic compound and dispersed in a solvent, and the emission layer is provided in contact with the insulating layer.

The substrate used may be selected among flexible substrates. A double insulation-type inorganic EL device is more excellent in symmetry relative to polarity upon application of an alternating current, so that it is preferred that the inorganic EL device has a first insulating layer and a second insulating layer, and the emission layer is provided between the first insulating layer and the second insulating layer.

EMBODIMENT 4

The quantum dot (emission-type) inorganic EL device as recited in any one of Embodiments 1 to 3, wherein the device has a first insulating layer and a second insulating film, and the (light-)emission layer is provided between the first insulating layer and the second insulating layer in contact therewith, respectively.

EMBODIMENT 5

The quantum dot (emission-type) inorganic EL device as recited in any one of Embodiments 1 to 4, wherein the quantum dot has a core/shell structure.

The quantum dot is preferably a "Type-I quantum dot." It is preferred that a valence band edge energy of a shell material is not larger than a valence band edge energy of a core material and a conduction band edge energy of the shell material is not less than a conduction band edge energy of the core material.

EMBODIMENT 6

The quantum dot (emission-type) inorganic EL device as recited in any one of Embodiments 1 to 5, wherein the emission layer contains a polycrystal whose crystallites are made of quantum dots having a core-shell structure.

The term "polycrystal whose crystallites are made of quantum dots" means that a plurality of quantum dots used as a starting material are not merely dispersed as in prior art, but the quantum dots are passivated. For instance, there is comprehended a polycrystal that is obtained by rendering quantum dots per se in a state of thermal non-equilibrium, under which while keeping the three-dimensional quantum well structure that is characteristic of quantum dot, a modifying molecule is desorbed from the surface of the quantum dot, followed by chemical bounding formation either of mutual shell surfaces of individual quantum dots having a core/shell structure, or of the shell surfaces and a matrix. We have found that the "polycrystal having quantum dots as crystallites" serves to provide a polycrystal whose emission efficiency is very high.

EMBODIMENT 7

The quantum dot (emission-type) inorganic EL device as recited in any one of Embodiments 1 to 6, wherein the emission layer is constituted of a buffer layer made of an inorganic semiconductor material and the quantum dots.

The quantum dot is preferably "Type I quantum dot." The shell material for quantum dot is preferably selected from materials capable of serving as the buffer layer.

It is preferred that the valence band edge energy of the semiconductor used to form the buffer layer is not larger than a valence band edge energy of a semiconductor serving as a quantum dot, and the conduction band edge energy of the semiconductor used to form the buffer layer is not less than a conduction band edge energy of the semiconductor used to form the quantum dot.

EMBODIMENT 8

The quantum dot (emission-type) inorganic EL device as recited in any one of Embodiments 1 to 7, wherein the emission layer is constituted of the quantum dots bonded as included in a buffer layer made of an inorganic semiconductor material.

The term "quantum dots bonded as included in a buffer layer" used herein indicates that a plurality of quantum dots serving as a starting material are not merely dispersed in a matrix as in prior art, but the quantum dots are passivated in a buffer layer. For instance, it means a state where quantum dots per se are rendered in a state of thermal non-equilibrium, under which while keeping the three-dimensional quantum well structure that is characteristic of quantum dot, a surface modifying molecule is eliminated from the surface of the quantum dot, followed by chemical bounding formation (i.e. passivation) of mutual shell surfaces of individual quantum dots having a core/shell structure, or the shell surface and the buffer layer made of the inorganic semiconductor material.

EMBODIMENT 9

The quantum dot (emission-type) inorganic EL device as recited in any one of Embodiments 1 to 8, wherein the quantum dots are ones deposited by an electrospray-ion beam deposition method.

EMBODIMENT 10

The quantum dot (emission-type) inorganic EL device as recited in any one of Embodiments 1 to 9 wherein a second insulating layer and the second electrode are successively built up on the emission layer, the second insulating layer and the second electrode being both transparent in a visible light region.

The term "transparent in a visible region" used herein means, as preferred, that a transmittance in a wavelength region of 400 to 760 nm is at 30% or over.

EMBODIMENT 11

The quantum dot (emission-type) inorganic EL device as recited in any one of Embodiments 1 to 10, wherein the first electrode and the first insulating layer are successively built up on the substrate, the substrate, the first electrode and the first insulating layer being, respectively, transparent in a visible light region.

The term "transparent in a visible region" used herein means, as preferred, that a transmittance in a wavelength region of 400 to 760 nm is at 30% or over.

EFFECT OF THE INVENTION

According to the invention, proper selection of a material and size of quantum dots enables an inorganic EL device of high chromatic purity corresponding to full color emission to be realized. Since the device constituting members are made entirely of inorganic materials, an inorganic EL device ensuring high durability, high reliability and a long lifetime can be realized. According to the invention, it is possible to provide a planar light-emitting device. When transparent materials are selected as materials for substrate and device constituting members, it is possible to provide a totally transparent light-emitting device. Since the manufacturing method is feasible by a low temperature process, a flexible substrate can be used.

BEST MODE FOR CARRYING OUT THE INVENTION

The device fabricated according to the invention has such a structure that a quantum dot deposited film serving as an luminescent active layer is sandwiched between insulating layers, which is formed between an upper electrode and a lower electrode made of a transparent conductive material. A semiconductor layer and/or other insulating layer serving as a buffer layer may be provided between the quantum dot deposited film and the insulating layer. In FIG. 12, there is shown a schematic view of an device structure (MISIM-type inorganic EL device structure) which has a structure using, as an upper electrode (second electrode) and a lower electrode (first electrode), an Au metal and a transparent conductive film of indium tin oxide (ITO), respectively, wherein a quantum dot deposited film, which is sandwiched between undoped ZnS buffer layers, is placed between the electrodes. The ITO electrode is one that is obtained by forming as a film on a glass substrate (crystalline size≈film thickness about 100 nm, surface roughness Ra=about 50 nm), subjecting to ultrasonic cleaning with organic solvents, blowing with inert gases and drying, followed by further forming an insulating film (first insulating layer) such as of tantalum oxide ($TaO_x$) or the like. When using a $TaO_x$ film, for example, an ordinary radiofrequency (13.56 MHz) magnetron sputtering apparatus was used wherein a metallic Ta target was subjected to reactive sputtering in an atmosphere of a mixed gas of $Ar+O_2$ to form the film. The substrate temperature during the deposition was set at from a room temperature to 200° C. The film thickness was thick enough to cover surface irregularities of the underlying ITO and secure smooth morphology and thin enough to obtain an strong electric field at low voltage and was set at 50 to 500 nm.

Prior to the formation of the quantum dot (QD) deposition layer serving as an light-emission active layer, a thin film of undoped-ZnS acting as a shell material was inserted as a buffer layer. The undoped-ZnS layer was formed on the insulating film as a buffer layer according to a molecular beam epitaxy method or an ordinary vacuum deposition method. A metallic zinc ingot was used as an zinc source and this was heated in a synthesized quartz glass effusion cell at 250 to 400° C. to obtain a flux (molecular beam) at a pressure of $1\times10^{-7}$ to $1\times10^{-6}$ Torr. High purity S grains were used as an S source and this was heated in a synthesized quartz cell equipped with a flow rate control valve to 100 to 200° C. The resulting S gas was passed through a cracking grid heated to 400 to 1000° C. and cracked to obtain a flux at a pressure of $2\times10^{-7}$ to $1\times10^{-5}$ Torr. The respective fluxes were irradiated on the substrate on which the insulating layer had been formed thereby forming an ZnS layer. The substrate temperature was appropriately determined within a range of room temperature to 300° C., and the film thickness was set at 1 to 10 nm.

The QD deposited film was formed by direct deposition with a unique ion source having an electrospray ionization (ESI) mechanism. A schematic view of an ES-IBD apparatus is shown in FIGS. 13 and 14. The details of the structure of the ES-IBD apparatus are particularly described in Patent Document (Patent Document 1) proposed by the present inventors. The apparatus includes an electrospray ion source for mainly ionizing a nanocrystal dispersion (1, 2, 2a to 2c, 3, 3a, 3b, 4a and 4c in FIG. 14), a free jet generating nozzle system for acceleration (4a, 5a in FIG. 14) and a differential vacuum-pumping system (4d in FIG. 14), an ion beam alignment lens system (6, 6a to 6e in FIG. 14), an analyzer for ion species selection and a differential vacuum-pumping system (71, 71a to 71e in FIG. 14), an ion decelerating system (52a to 52c, 52e, 52f in FIG. 14), a film-deposition chamber and a main vacuum pumping system (51, 51d, 52, 52d in FIG. 14), and a substrate support device having a resistance heating mechanism (52g in FIG. 14). It will be noted that in a schematic sectional view of the ES-IBD apparatus shown in FIG. 13, the film-forming chamber and a vacuum-pumping system therefor are omitted. The ion deceleration system may be changed with an electrostatic lens system wherein the substrate is placed on a support (synthetic quartz wafer) thereby providing a mechanism of decelerating ions arriving at the substrate. In either case, ionic impact with the depositing species per se and the atoms on the film surface being deposited can be reduced. In this case, the absolute velocity of ions emitted from the ES-IBD apparatus was set at $1.4\times10^3$ to $2.6\times10^3$ m/second (typically at $1.4\times10^3$ m/second) to keep a high transport yield of the beam. In this connection, the diameter of CdSe/ZnS nanoparticles having a core/shell structure is about 1.9 to 5.2 nm. If this forms a single monovalent ion, the energy thereof is at $1.4 \times 10^2$ to $9.8 \times 10^3$ eV (typically at $1.7 \times 10^2$ to $3.4 \times 10^3$ eV). Where this ion collides directly with the substrate surface, it is inevitable that the substrate and nanocrystal suffer deterioration by means of a dissipated energy. To avoid this, there was provided a mechanism wherein the substrate surface was insulated from a ground potential and was spontaneously increased in potential by means of charges of the ions arrived thereat, and subsequently arrived ions are decelerated. Using a group of parts for constituting an electrostatic lens system for ion deceleration, an additional mechanism such as of focusing lenses, a suppression electrode and the like is needed in order to suppress beam diverging. In this instance, an arrangement wherein no energy analyzer is used is adopted so as to specifically realize a fast deposition rate, for which an ion whose weight to charge ratio is very large is supposed and thus, such an addition mechanism is omitted (FIG. 13).

Semiconductor nanocrystals "quantum dots" used for deposition may be made of any materials. In this instance, one which was introduced into an electrospray ion source was a dispersion, in toluene ($CH_3C_6H_5$) or a mixture of toluene: chloroform=1:0.1 to 10 (typically 1:3), of CdSe/ZnS nanocrystal particles whose surface was modified with trioctylphosphine oxide (TOPO). The concentration of the CdSe core in terms of a weight to solution volume ratio was set at 0.1 to 10 mg/ml (typically at 2 mg/ml). The flow rate of the dispersion transported to a microcapillary (with a tip outer diameter of about 50 μm) through a syringe and a syringe pump and a Teflon (registered trade name) tube system for dispersion transport was set at 0.1 to 10 μl/minute (typically at 1 μl/minute), and an applied voltage against to grounding to the capillary was set at 0.5 to 5 kV (typically at 1.6 kV). The dispersion fed under pressure to the tip of the capillary takes a form of so-called Cone jet mode wherein a uniform plume can be released in air. The distance between the capillary and the free jet nozzle was set at 3 to 6 mm (typically at 4 mm). Most of the plume was flown into the nozzle and a free jet was formed in a distance of 3 to 6 mm (typically 3 mm) between the free jet nozzle and skimmer nozzle held at a pressure of 100 to 300 Pa (typically 200 Pa) by means of a differential vacuum pump system, followed by clipping into a beam having a velocity of $1.4 \times 10^3$ to $2.6 \times 10^3$ m/second by means of the skimmer nozzle as stated hereinbefore and aligning and collimating by an einzel electrostatic lens system. Thereafter, the beam was transported to a film-deposition chamber wherein it arrived at a substrate surface. The film-deposition chamber was held at a high vacuum on the order of $10^{-4}$ Torr., by use of a turbo molecular pump. The ion current density observed in the vicinity of the substrate was found to be at about $4 \times 10^{-10}$ A/cm$^2$. The deposition time was set at 15 to 60 minutes and the substrate temperature was at about 100° C.

After the deposition of the light-emission active layer, a ZnS buffer layer and a TaOx insulating layer (second insulating layer) were deposited thereon, respectively. The deposition process is similar to those for the buffer layer and insulating layer provided below the emission active layer.

Thereafter, in order to ensure insulation between the ITO electrode and the emission active layer, a gold (Au) film (second electrode) serving as a metallic electrode was formed on the upper side TaOx layer. The Au electrode film was formed in a thickness of about 500 nm according to a vacuum deposition method using an ordinary resistance heating evaporation source.

The light-emission active layer of the thus fabricated ITO/TaOx/ZnS/(CdSe/ZnS-QD)/ZnS/TaOx/Au device formed by the ES-IBD is in the form of a very thin film having a thickness of about 50 nm while preserving the nanocrystal structure. The photoluminescence (PL) spectra of this device at room temperature excited by application of an ordinary near-ultraviolet ray are identical to the spectra obtained from the starting nanocrystal colloidal dispersion, from which it will be seen that they originate from recombination emission at a quantized level in a three-dimensional quantum well surrounded by an adequately high potential barriers. The PL peaks, which are considered to result from the quantized 1 s-1 s intralevel transition, are predominant in a near-infrared to a near-ultraviolet region, and no group of complicated broad peaks is found as will be observed in a spin coated film or a product formed by a film-forming method using drying after dropping. This means that recombination emission derived from the organic matter originated from the surface modifying molecule or derived from defects and surface levels is very week and a good quantum well structure wherein the CdSe well and the ZnS barrier are bonded together is formed.

It will be noted that the insulating layer used in the invention is not limited to such a material indicated above and may be appropriately chosen. For instance, it is possible to select from silicon nitride, tantalum oxide, silicon oxide, yttrium oxide, alumina, hafnium oxide, barium tantalum oxide and the like. The quantum dots used in the invention are not limited to those materials mentioned above and may be appropriately selected. For instance, selection from CdSe, CdS, PbSe, HgTe, CdTe, InP, GaP, INGaP, GaAs, InGaN, GaN and the like, and mixed crystals thereof may be possible. Depending on an intended emission wavelength, a type of material for and a crystal size of the quantum dot are chosen.

EXAMPLES

Examples 1 to 3

TaOx/(CdSe/ZnS-QD)/TaOx/Au stacked film structure were built up on an ITO-deposited glass substrate in this order. Luminescence spectra of Samples #1, #2 and #3 of the thus fabricated devices of (glass substrate/ITO/TaOx/(CdSe/ZnS-QD)/TaOx/Au) are shown in FIGS. 1 to 3, respectively. These devices emit EL in color inherent to the nanocrystal deposition layer sandwiched between the insulating layers.

The fabrication of the device is described in more detail. The TaOx film was grown on the substrate, kept at an ambient temperature, by use of a radiofrequency magnetron sputtering apparatus. The film thickness was set at about 400 nm. The quantum dot structure film was deposited over the film using, as a starting material, a CdSe/ZnS nanocrystal dispersion having a core/shell structure modified with TOPO on the surface thereof, thereby providing an emission layer. The deposition method was an electrospray ion beam deposition (ES-IBD) method (Patent Document 1). According to this method, the nanocrystals dispersed in a solvent was introduced into vacuum as an ion beam, thereby enabling deposition on the substrate. In the device, the light-emission active layer formed by the ES-IBD forms a thin film with a thickness of about 50 to 100 nm while preserving the nanocrystal structure. More particularly, a polycrystal film wherein individual quantum dots are provided as a crystallite is formed. The substrate temperature during the deposition was held at room temperature for Sample #1 and 100° C. for Sample #2 and Sample #3. Although the substrate temperature may be selected from a range of room temperature to 200° C., about 100° C. is preferred. If the temperature is too low, impurities in the solution remain and if too high, luminescent activity of the nanocrystals degrades. The thickness of the deposition film was set at about 30 to 0.100 nm. The TaOx film was grown on the nanocrystal deposition film in a thickness of about 400 nm, followed by formation of an Au electrode by a vacuum deposition method using a shadow mask.

The measurements of luminescence spectra and intensities thereof are described. The photoluminescence (PL) of these devices was measured by use of a fluorospectrophotometer FP-6500DS, made by Jasco Corporation, wherein monochromatic light having a wavelength of 350 nm was used as excitation light. The temperatures of samples under measurement were all room temperature. Some of the samples were also subjected to measurement of PL spectra of a starting dispersion solution. The measurement of EL was carried out by applying a low frequency sine wave voltage between the ITO electrode and the Au electrode. The Au electrode had a size of 1 mm wide×1 mm long square and a voltage with frequency f=100 kHz and voltage V=0 to 250 Vpp was applied between both electrodes via In thereby measuring an electric current and electroluminescence (EL). The luminescence outputted through the glass substrate of the device was taken in a detector of the fluorospectrophotometer by use of an optical fiber for measurement. Although the current values have individual element-to-element variability, a typical value is about 10 mApp in case of V=100 Vpp.

The PL spectra of the device and the PL spectra of the staring solution were substantially identical with each other with respect to all of the samples.

FIGS. 1 to 3, respectively, show EL spectra, at room temperature, of devices using nanocrystals wherein the diameter of the core (CdSe) in the quantum dot CdSe/ZnS is, respectively, about 5.2 nm (Sample #1), 2.4 nm (Sample #2) and 1.9 nm (Sample #3). It will be noted that the thickness of the shell (ZnS) was, respectively, approximately 0.4 nm, 1.0 nm and 1.4 nm. It will be seen that the EL spectra obtained from Sample #1 had a single peak at approximately 600 nm and light emission was originating in quantized levels in the nanocrystal. In FIG. 2, EL spectra obtained from Sample #2 at room temperature are shown. It will be seen that the spectra have peaks at 540 nm mainly originating in transition between quantized levels or in exciton emission and at 705 nm originating in others. In FIG. 3, EL spectra obtained from Sample #3 at room temperature are shown. The spectra have peaks at 475 nm originating in transition between quantized levels or light-emission from exciton and at 620 nm originating in others, along with a small peak appearing at 545 nm. It will be noted that the numerical values in FIGS. 2 and 3 indicate peak-to-peak voltages being applied.

Although, in Samples #2 and #3, there exist emission peaks other than the EL peaks, which are derived from recombination emission between the quantized levels or derived from exciton, it has been already known that the intensity and spectrum of the emission peak can be changed depending on the fundamental stacked structure of an EL device, the concentration of a starting dispersion solution, the composition of a solvent, a substrate temperature, the thickness of an emission layer and the like. For instance, like Samples #4 to #7 appearing hereinlater, a spectrum made of a single peak ascribed to the transition between quantized levels or exciton emission can be made so narrow as to compare to a peak width of a luminescence emitted from starting nanocrystals thereby realizing an increased intensity.

An attempt was made to mix two or more nanocrystal dispersions having different size dispersions for use as a starting material. In this case, two or more peaks derived from the size dispersions of the respective starting nanocrystals simultaneously appeared.

An attempt was also made to use, as a starting material, a dispersion of nanocrystals having a core/shell structure of InGaP/ZnS in toluene or water. From a fabricated EL device, EL having a single peak was obtained.

For comparison, QD of CdSe/ZnS was carried out by a conventional deposition method or a spin coating method that is typical of coating methods to make a film (glass substrate/ITO/TaOx/(CdSe/Zn-QD)/Tax/Au like such a sample as set out hereinabove, followed by measurements of luminescence and spectra, and intensity thereof. The nanocrystals used were ones which had a diameter of the core crystal of about 2.1 nm and a peak wavelength of 525 nm of the PL spectra. A ratio $N_C/N_{Cd}$ between the number of carbon atoms $N_C$ and the number of cadmium atoms $N_{Cd}$ was at 55 or over. As shown in FIG. 10, although PL spectra contain emission components other than the peaks derived from the quantum dot structure, a predominant component forms a peak like the nanocrystals in the starting dispersion with its intensity being equal to or greater than those of other samples appearing hereinafter (formed by the EB-IBD method). However, no peak that could be identified as light emission originating from quantized levels or exciton is shown. Thus, it will be seen that this is not suited for emergence of EL through quantized levels owing to the electron and hole quantum confinement.

Examples 4 to 7

Films were successively built up on an ITO-deposited glass substrate so as to provide glass substrate/ITO/TaOx/ZnS/(CdSe/ZnS-QD)/ZnS/TaOx/Au thereby obtaining devices of Sample #4, #5, #6 and #7. EL spectra obtained from these devices are shown in FIGS. 4 to 7, respectively. These devices emit luminescences with emission colors inherent to the nanocrystal deposited films each sandwiched between the ZnS layers. The TaOx, (CdSe/ZnS-QD) and Au were, respectively, deposited in the similar manner as in Samples #1 to #3. ZnS was deposited by use of a molecular beam epitaxy (MBE) apparatus. The substrate temperature was set at 150 to 200° C. for the growth of the ZnS layer (first buffer layer) at a side nearer to the ITO electrode and at a relatively lower temperature of 80 to 150° C. for the growth of the ZnS layer (second buffer layer) nearer to the Au electrode so as to prevent deactivation of the nanocrystals. The growth conditions of ZnS included a Zn flux controlled at $1 \times 10^{-7}$ Torr., and an S flux at $12 \times 10^{-7}$ Torr., followed by growth in a thickness of about 5 nm, respectively. The measuring method of light emission spectra was similar to the measurement of Samples #1 to #3.

The luminescence spectra obtained from a sample (Sample #4) using CdSe/ZnS nanocrystals whose diameter of the core crystals was approximately at 5.2 nm are shown in FIG. 4. It will be noted that the thickness of the shell (ZnS) was at approximately 0.4 nm. A ratio $N_C/N_{CD}$ between the number of carbon atoms $N_C$ and the number of cadmium atoms $N_{Cd}$ was measured by use of SIMS and was found to be approximately 1.5. PL spectrum of the nanocrystal dispersion used for this sample as a starting material is also shown in the figure as "liquid PL." PL spectrum obtained from a fabricated solid state device is shown as "film PL." Moreover, EL spectrum of the device is shown as thick "EL." It will be noted that the PL spectrum is normalized to the peak intensity of the EL spectrum. As will be seen from the graph, the PL spectrum obtained from the starting dispersion solution and the device are identical with each other, and are substantially identical with the EL spectrum except for slight redshift. The dependences of the EL peak intensity obtained from Sample #4 on the applied voltage (peak-to-peak voltage) and also on the applied frequency are, respectively, shown in FIGS. 8 and 9. It will be seen that these devices are able to yield a maximum value of emission intensity under the respective certain conditions of applied voltage and frequency. Although such a fact is well known that with an ordinary inorganic EL device of the type to which AC is applied, the integral time of light-emission can be increased so that a higher frequency results in a higher electroluminescent intensity, there exists, with this device, a frequency which provides a local maximum value of electroluminescent intensity. It is to be noted that the voltage and frequency, at which the EL intensity becomes local maximum, depend on the type of device.

Likewise, device samples (Samples #5, #6 and #7) using starting core/shell nanocrystals having diameters of the core crystals of about 2.4 nm, 2.1 nm and 1.9 nm, respectively, were made and subjected to measurements of PL and EL spectra, with the results shown in FIGS. 5, 6 and 7. It will be noted that the shell thicknesses were, respectively, at about 1.0 to 1.5 nm. Ratios between the number of carbon atoms $N_C$ and the number of cadmium atoms $N_{Cd}$, i.e. $N_C/N_{Cd}$, in Samples #6 and 7 was measured by SIMS were, respectively, at about 1.7 and about 2. For the fabrication of Sample #5, a structure wherein an intermediate buffer layer (about 5 nm) was inserted into the nanocrystal deposition layer, i.e. ZnS/(CdSe/ZnS-QD)/ZnS/(CdSe/ZnS-QD)/ZnS, was adopted so as to ensure a thick emission layer. Because the thus formed emission layer has a high residual stress, an increased film thickness causes the stacked film structure to undergo a severe strain, or a film structure to be broken due to the stress. In this device, such a periodical stacked film structure as mentioned above was provided so as to reduce the residual stress.

The peak positions found in the PL spectra of the solid state devices per se obtained from Samples #5 and #6, PL spectra of the starting dispersion solutions and the EL spectra obtained from the devices are well identical with one another. When compared with Sample #4, the full width at half maximum of EL becomes slightly wider. As will be apparent from FIG. 7, the EL peak in the blue region tends to shift toward a higher energy side than the PL peak. The EL spectra shown in the figures are, respectively, ones obtained at applied voltages of 140, 160 and 180 Vpp. It will be seen that as the applied voltage increases, the degree of shift increases.

As will be seen in FIGS. 6 and 7, where the size of the quantum dots is small, a peak other than the peak originating from the transition between the quantized levels or light-emission from exciton tends to become pronounced. It has been found that this sub-peak changes in intensity depending on the concentration of the solution, the composition of solvent, the substrate temperature and the thickness of the light-emission layer. If these conditions are optimized, the peak can be eliminated. Additionally, this peak can be practically cut off by means of a filter.

A chromaticity diagram of light emission obtained by cutting unnecessary peaks from the measured EL spectra by means of a filter is shown in FIG. 11. FIG. 11 is a chromaticity diagram of EL spectra (marks Δ and ♦ in the figure) at room temperature, which are obtained from device (glass substrate/ITO/TaOx/ZnS/(CdSe/ZnS-QD)/ZnS/TaOx/Au) using four kinds of CdSe/ZnS core/shell structured quantum dots. In the figure, marks x and ■ correspond to cases where the spectra were subjected to sharp low cut filters of wavelengths of 535 nm and 600 nm, respectively. From the figure, it will be seen that full-color display is possible by use of these EL devices. It will be noted that mark ○ indicates chromaticities of fluorescent materials used in cold cathode tubes (cathode ray tubes) or ordinary EL displays of prior art.

Example 8

A device was fabricated by successively building up films on an ITO-deposited glass substrate to provide glass substrate/ITO/TaOx/BaTa$_2$Ox/ZnS/(CdSe/Zn-QD)/ZnS/BaTa$_2$Ox/TaOx/IZO. This device has such a structure that an insulating layer is sandwiched between the opposite transparent electrodes and the nanocrystal deposited film is further sandwiched between the insulating layers. EL is emitted with colors inherent to the nanocrystals present in the respective devices. Because the substrate and the respective constituting layers are all transparent, so that a transparent, see-through optical transmissive device is realized.

The TaOx film and (CdSe/ZnS-QD) film were, respectively, grown in the same manner as in Examples 1 to 3. The BaTa$_2$Ox (on the substrate and atmospheric exposed sides) and IZO films were grown by use of a radiofrequency magnetron sputter apparatus while setting a substrate temperature at 150° C., 100° C. and room temperature, respectively. The BaTa$_2$Ox films were formed in a thickness of about 5 nm by use of a BaTa$_2$Ox target, respectively. The IZO film was formed in a thickness of 150 nm by use of an InO target (InO:Zn) doped with 10% of Zn. The ZnS film was deposited in the same manner as in Examples 4 to 7. When applied with a voltage, the luminescence spectra obtained from a sample using CdSe/ZnS nanocrystals wherein a diameter of core crystals was about 5.2 nm showed substantially the same profile as the spectra of FIG. 4 obtained in Examples 4 to 7 since the size of quantum dots was same as in Examples 4 to 7. When light was turned off, this device was substantially perfectly transparent although assuming a slight degree of coloration due to the ITO and IZO. The transmittances of the devices were measured by use of a ultraviolet-visible spectrophotometer, whereupon the transmittances were not lower than 70% in a wavelength region of 400 nm to 760 nm. This value is a measured one containing an attenuation of transmitted light by reflection.

Example 9

A device was fabricated by successively building up films on an ITO-deposited polycarbonate (PC) substrate to provide substrate/ITO/TaOx/ZnS/(CdSe/Zn-QD)/ZnS/TaOx/IZO. This device has such a structure that insulating layers are sandwiched between both transparent electrodes and the nanocrystal deposition film is further sandwiched between the insulating layers. EL is emitted with colors inherent to the nanocrystals present in the respective devices. Because the substrate and the respective constituting layers are all transparent, so that a completely transparent, see-through optical transmissive device is realized.

The TaOx film and (CdSe/ZnS-QD) film were grown in the same manner as in Examples 4 to 7. In order to prevent the PC substrate from a plasticization, the substrate temperature was set at 130° C. or below. Although the ZnS films were deposited by use of an apparatus as used in Examples 4 to 7, the substrate temperature was set for the deposition at 80° C. to 130° C. so as to prevent the PC substrate from a plasticization. The IZO film was grown in the same manner as in Example 8. The luminescence spectra obtained, upon application of a voltage, from a sample using CdSe/ZnS nanocrystals wherein the diameter of the core crystals was about 5.2 nm exhibited substantially the same profile as the spectra of FIG. 4 obtained in Examples 4 to 7 because of the same size of quantum dots as in Examples 4 to 7. At the time when the light was turned off, the device was substantially completely transparent although the IZO and ITO assumed a slight degree of coloration, like Example 8. The transmittance of the fabricated device was measured by use of an ultraviolet-visible spectrophotometer, with the results similar to those of Example 8.

Example 10

A device was fabricated by successively building up films on an ITO-deposited polycarbonate (PC) substrate to provide substrate/ITO/TaOx/ZnS/(CdSe/ZnS-QD)/ZnS/IZO. Like Example 8, this device has such a structure that the nanocrystal deposited film is sandwiched between both transparent electrodes. If the insulating layer exists on one side, a necessary dielectric strength voltage is ensured. In this case, although symmetry relative to polarity upon application of an alternating current becomes poorer than that of a double insulated device, there is an advantage in that after deposition of the light-emission layer, it is not necessary to further deposit another insulating layer, thereby leading to reduction of a stress as will be exerted on the light-emission layer upon film growth. The thus fabricated devices emit EL's with colors inherent to the nanocrystals contained the respective devices and are transparent with respect to all of the substrate and the constituting layers, thereby realizing an device of a completely transparent, see-through optical transmission.

The TaOx film and (CdSe/ZnS-QD) film were grown in the same manner as in Examples 4 to 7. In order to prevent the PC substrate from a plasticization, the substrate temperature was set at 130° C. or below. Although the ZnS films were deposited by use of an apparatus as used in Examples 4 to 7, the substrate temperature was set for the deposition at 80° C. to 130° C. so as to prevent the PC substrate from a plasticization. The IZO film was grown in the same manner as in Example 8. The electroluminescence spectra obtained, upon application of a voltage, from a sample using CdSe/ZnS nanocrystals wherein the diameter of the core crystals was approximately 5.2 nm exhibited substantially the same profile as the spectra of FIG. 4 obtained in Examples 4 to 7 because of the same size of quantum dots as in Examples 4 to 7. At the time when the light was turned off, the device was substantially completely transparent although the IZO and ITO assumed a slight degree of coloration, like Example 8. The transmittance of the fabricated device was measured by use of an ultraviolet-visible spectrophotometer, with the results similar to those of Example 8.

As set out hereinabove, the above-stated light-emitting devices exhibit EL that substantially faithfully reproduces spectra by intra quantized level recombination transition emission or light-emission from exciton inherent to the nanocrystals used in the light-emission layer. Accordingly, if the size variance of the nanocrystals deposited is made smaller, the color purity of the device can be more improved. As to the peak wavelength and color, they can be selected in conformity with the number of nanocrystals. This can be utilized for monochromic displays, full-color displays, self-luminous full color posters and the like.

Figure 1:
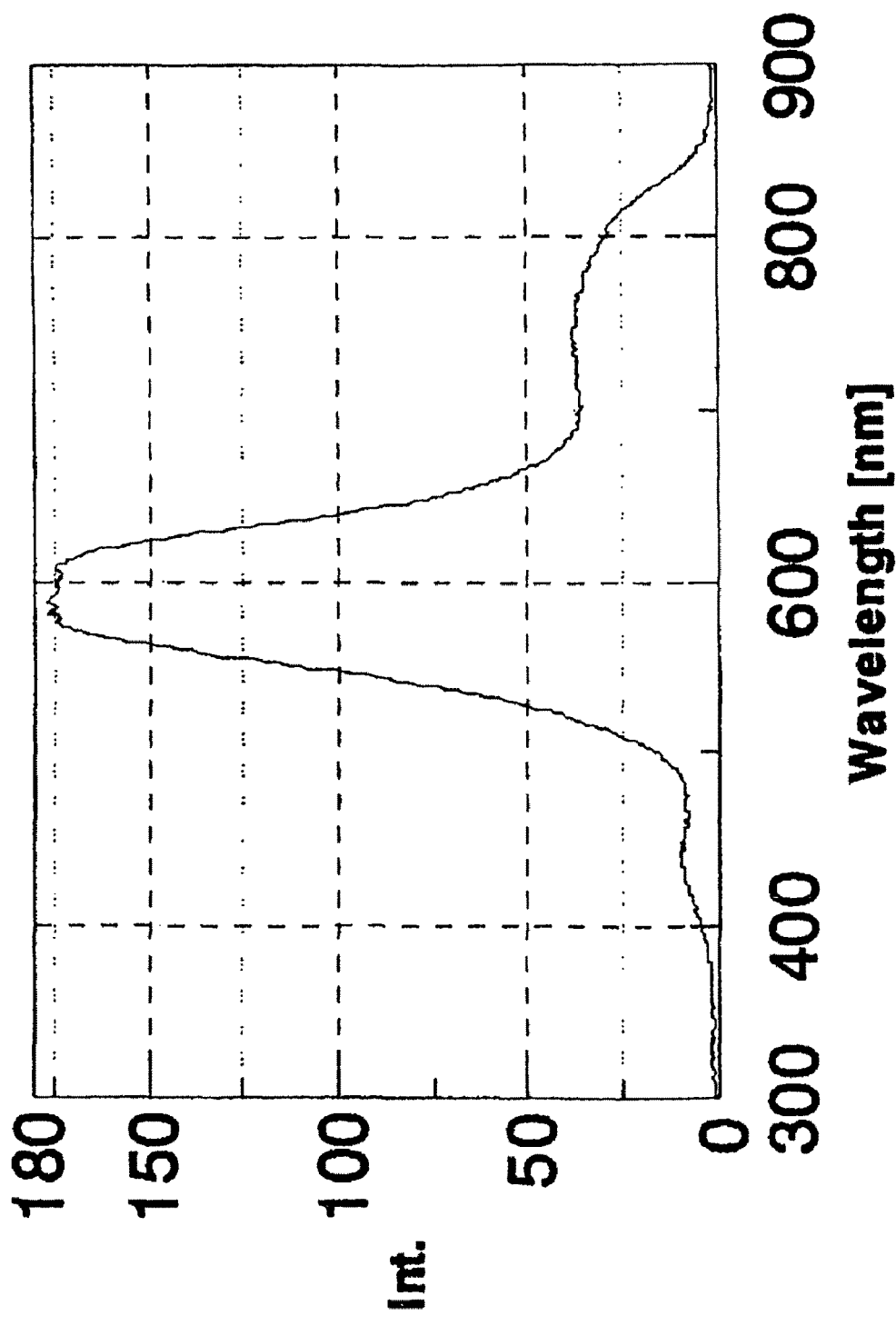
[FIG. 1] is a diagram illustrating an example (Sample #1) of the invention.
Figure 2:
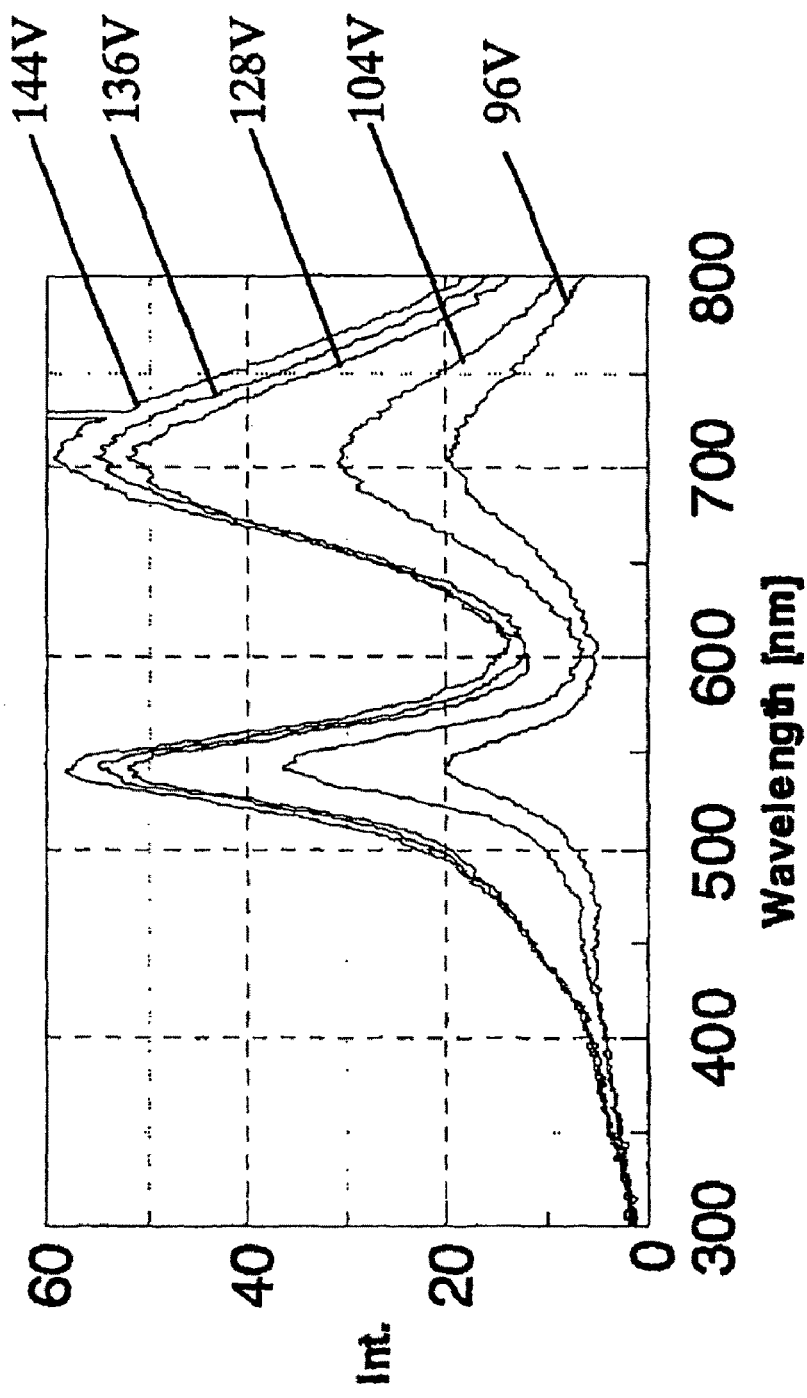
[FIG. 2] is a diagram illustrating an example (Sample #2) of the invention.
Figure 3:
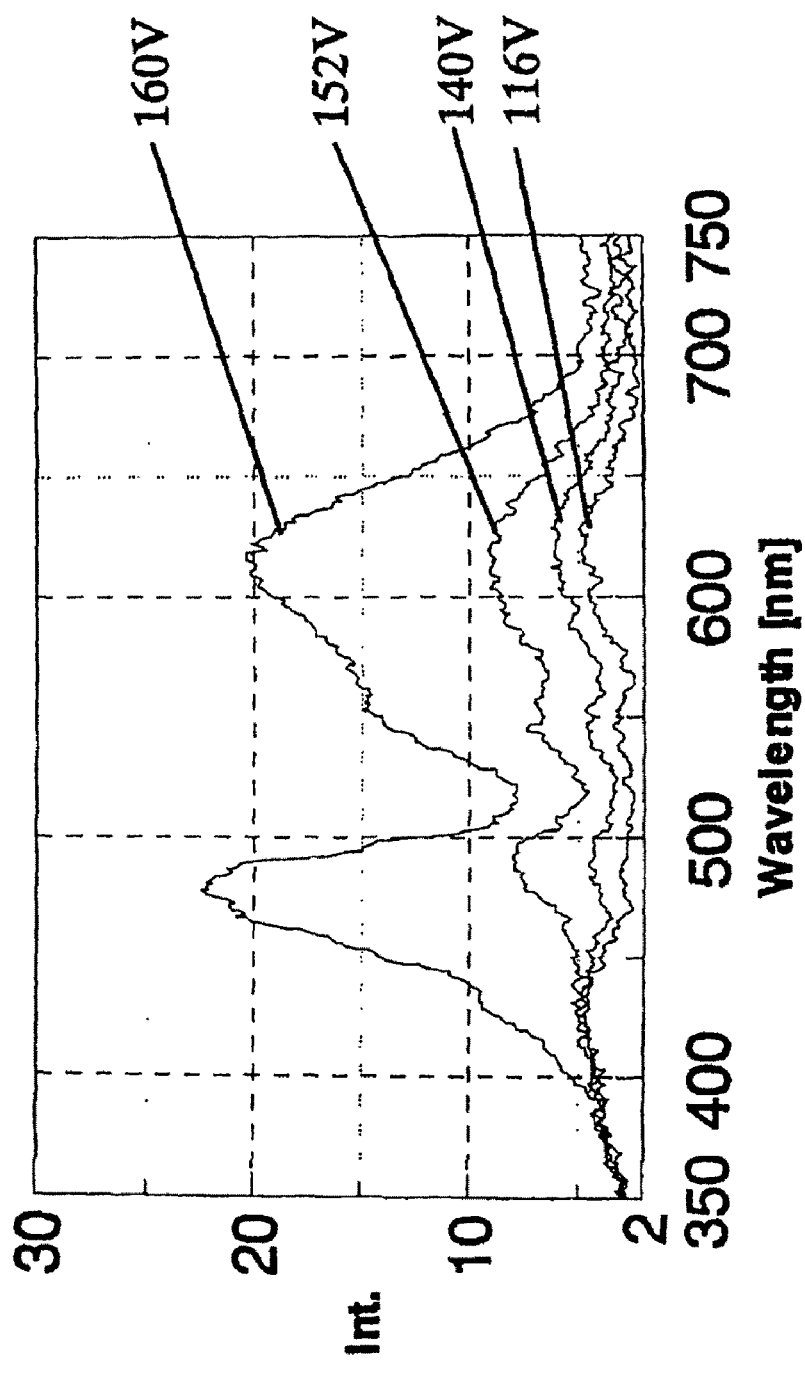
[FIG. 3] is a diagram illustrating an example (Sample #3) of the invention.
Figure 4:
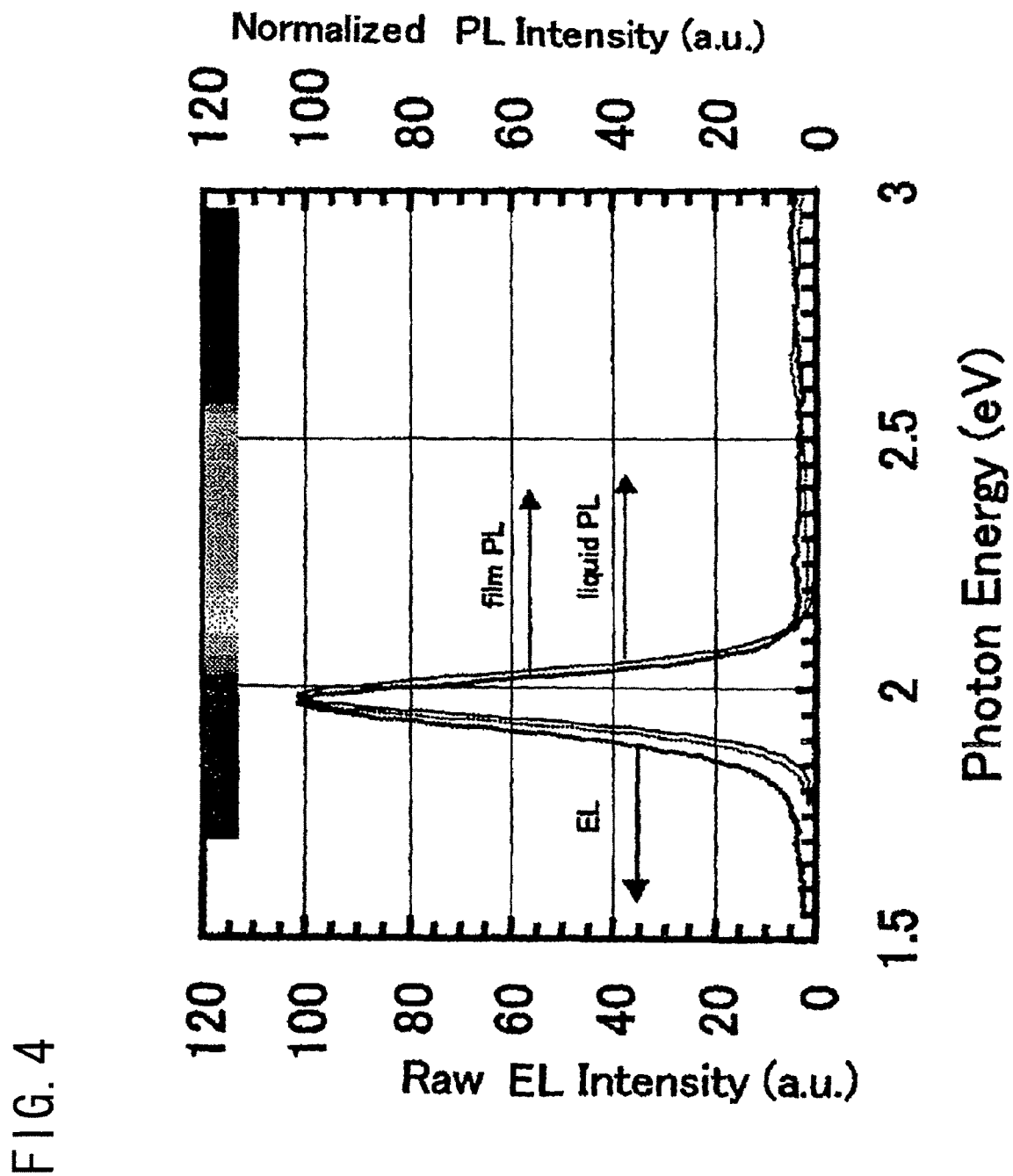
[FIG. 4] is a diagram illustrating an example (Sample #4) of the invention.
Figure 5:
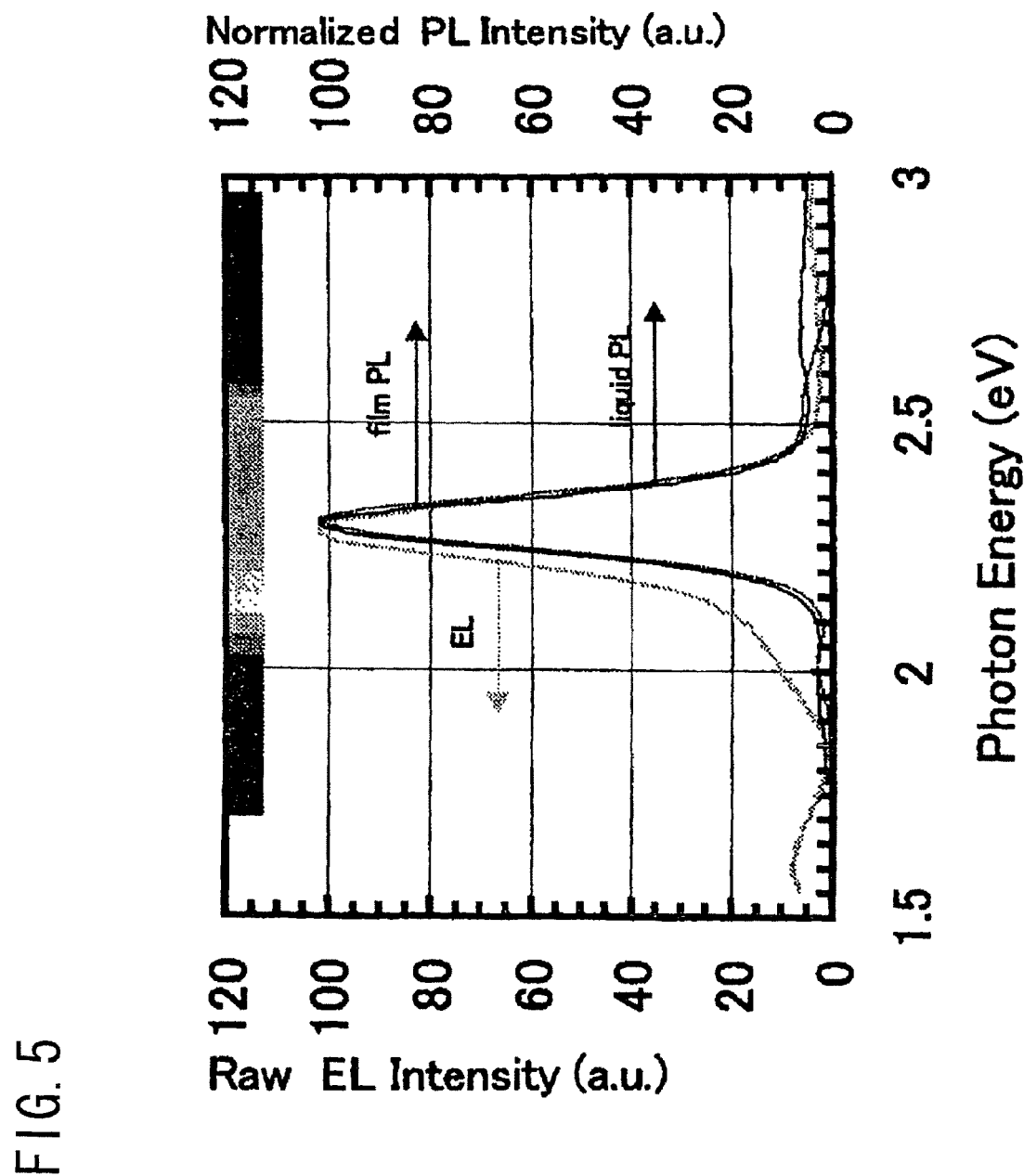
[FIG. 5] is a diagram illustrating an example (Sample #5) of the invention.
Figure 6:
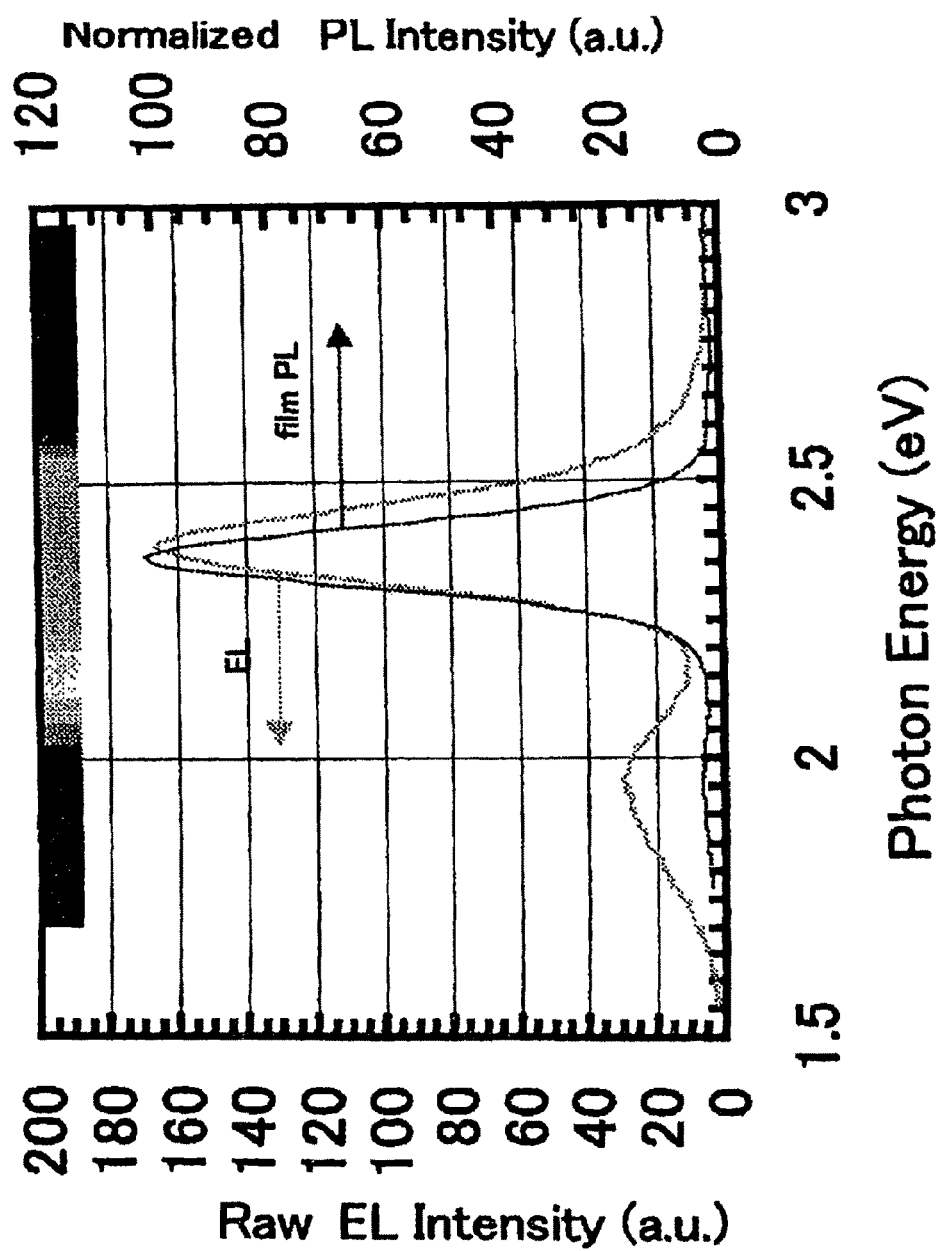
[FIG. 6] is a diagram illustrating an example (Sample #6) of the invention.
Figure 7:
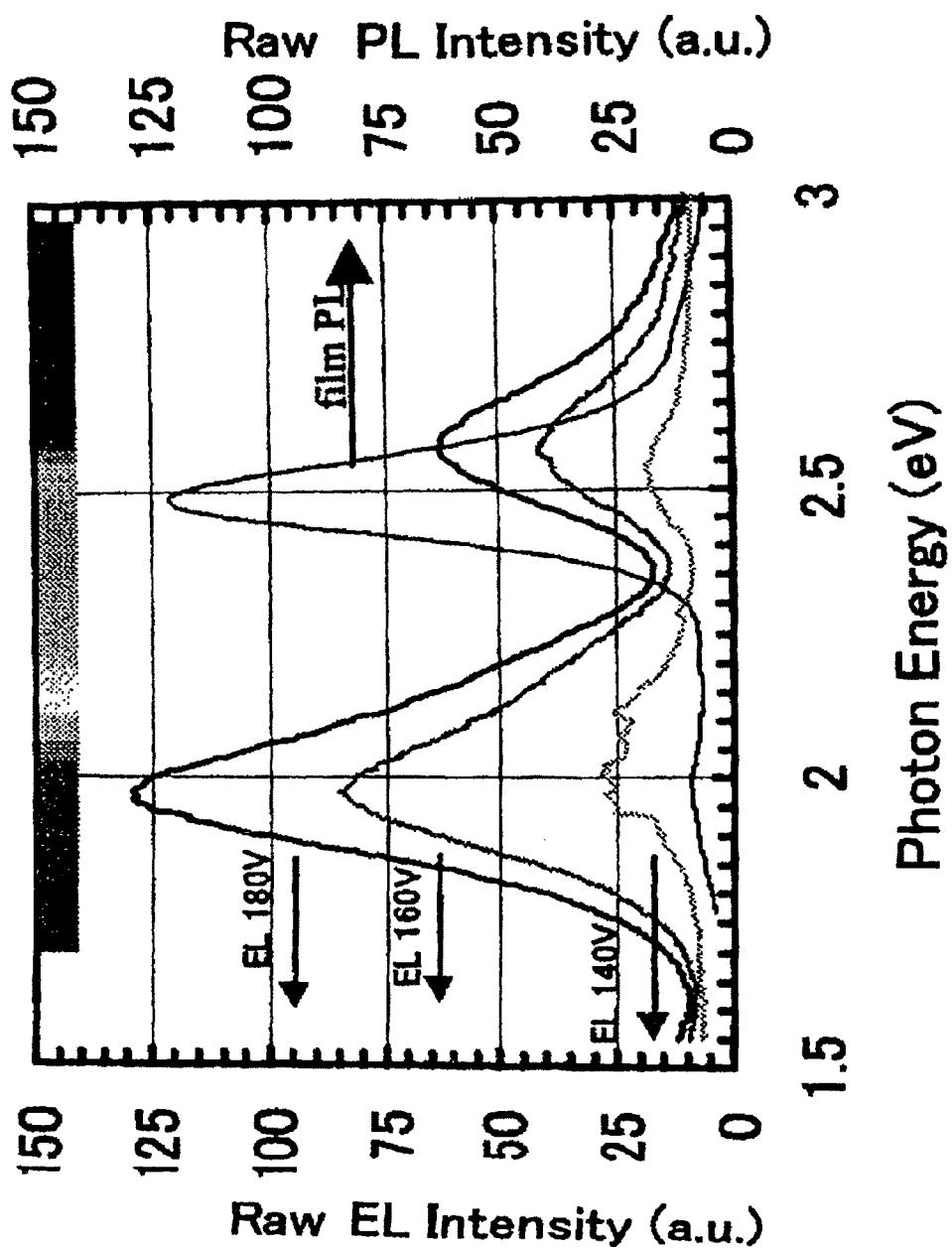
[FIG. 7] is a diagram illustrating an example (Sample #7) of the invention.
Figure 8:
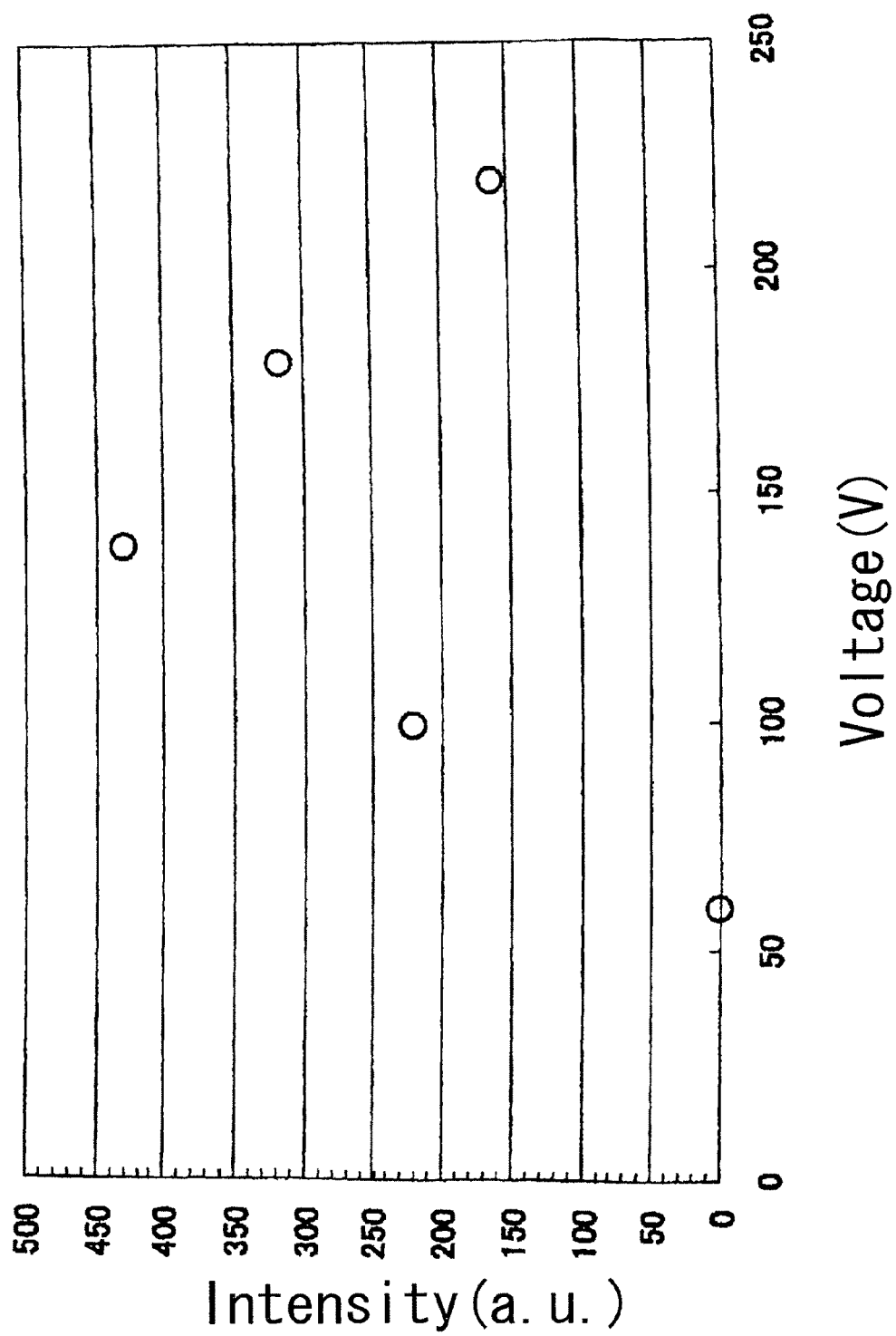
[FIG. 8] is a graph illustrating an example (Sample #4) of the invention.
Figure 9:
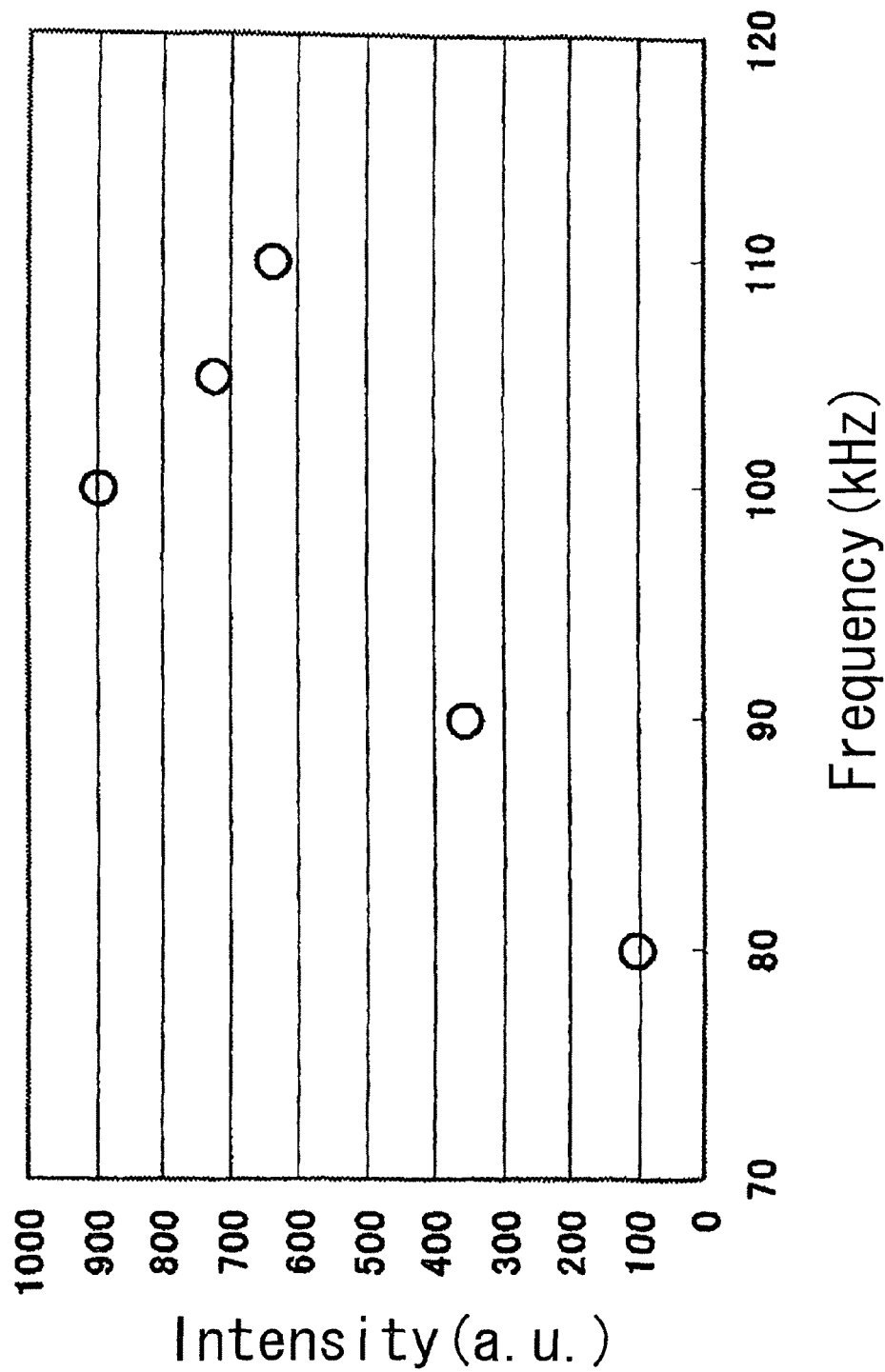
[FIG. 9] is a graph illustrating an example (Sample #4) of the invention.
Figure 10:
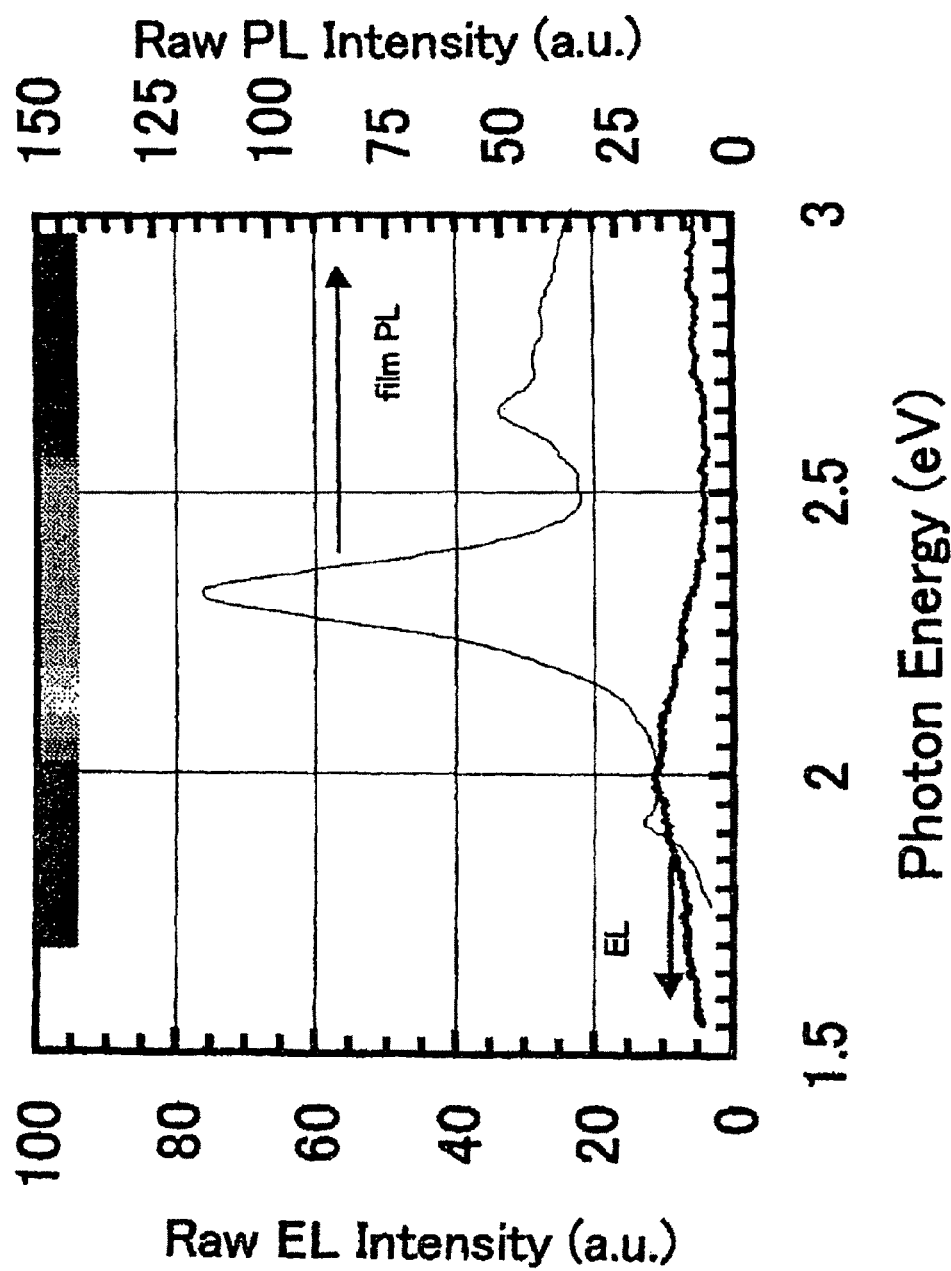
[FIG. 10] is a diagram illustrating a prior-art example.
Figure 11:
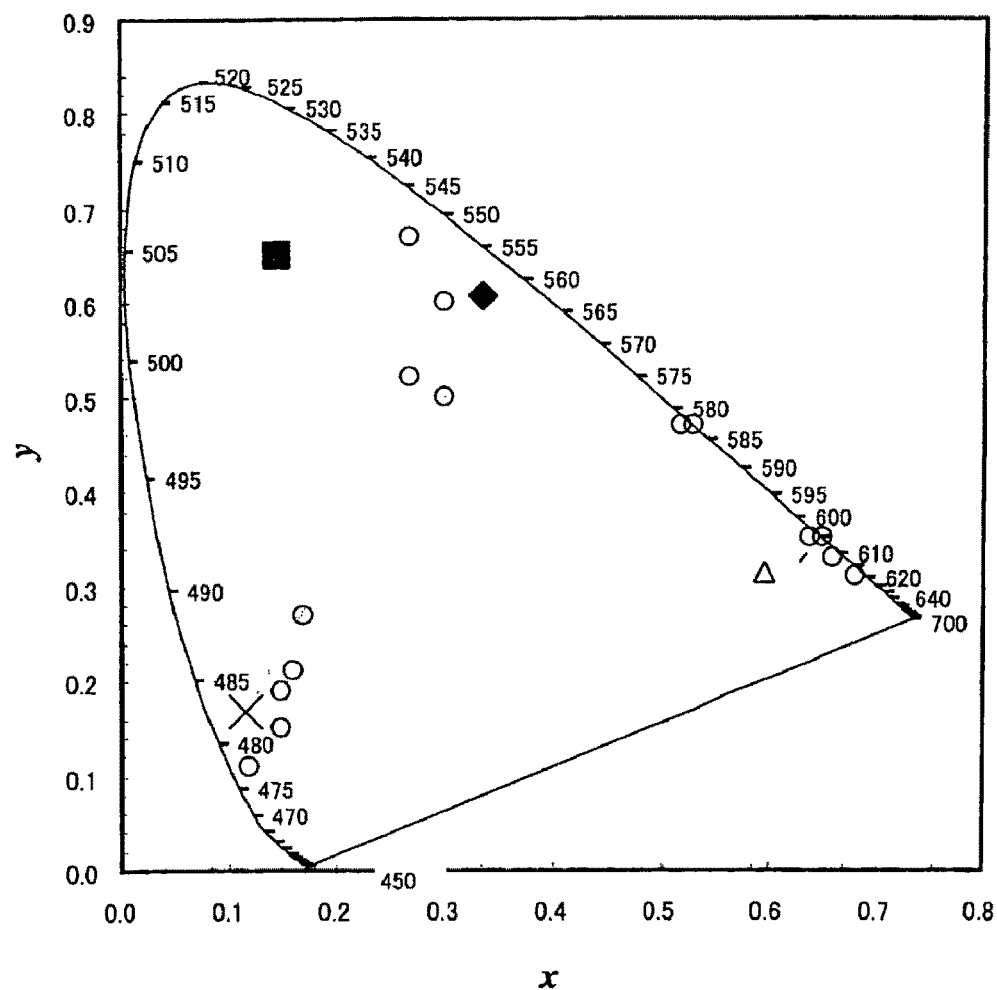
[FIG. 11] is a graph illustrating an example of the invention.
Figure 12:
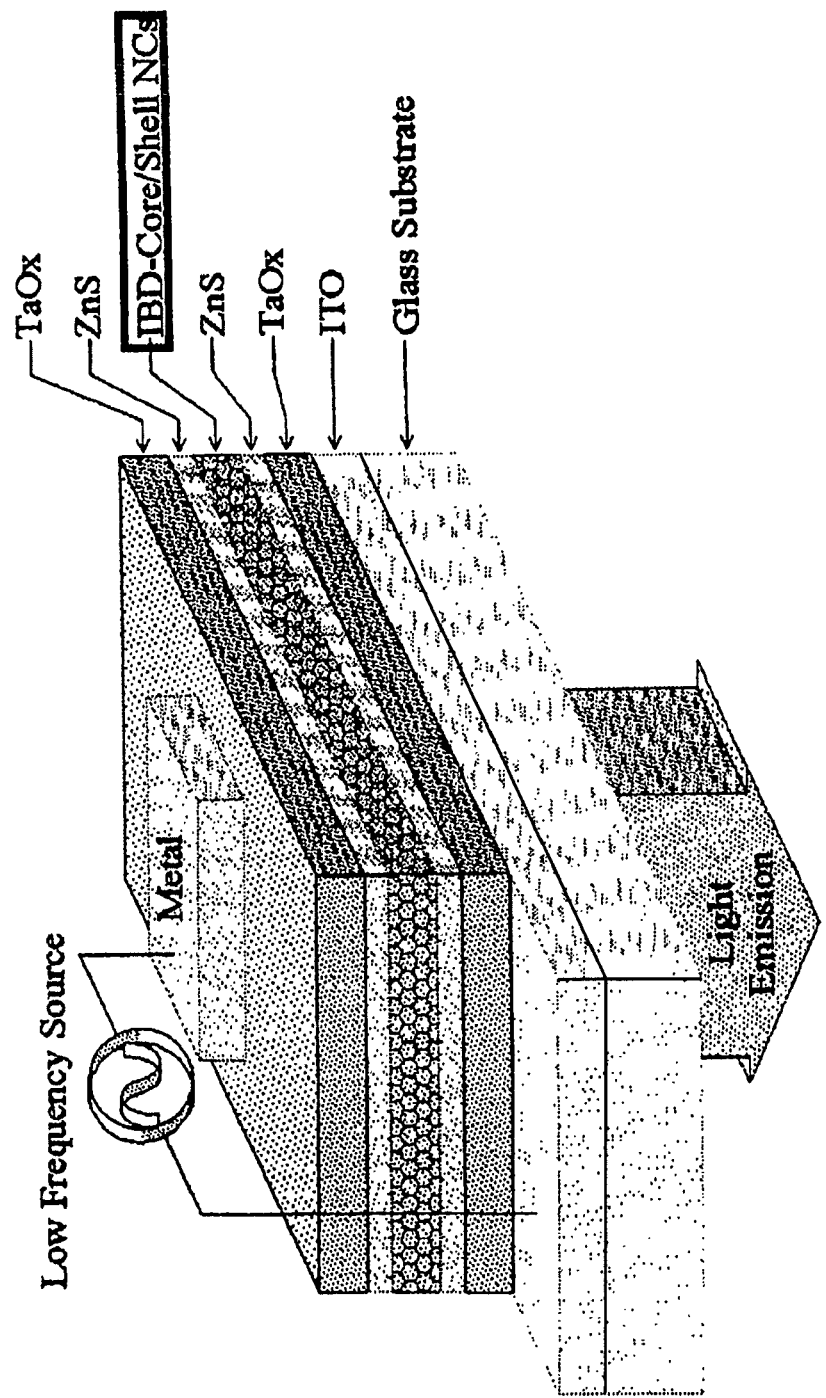
[FIG. 12] is a schematic view showing an embodiment of the invention.
Figure 13:
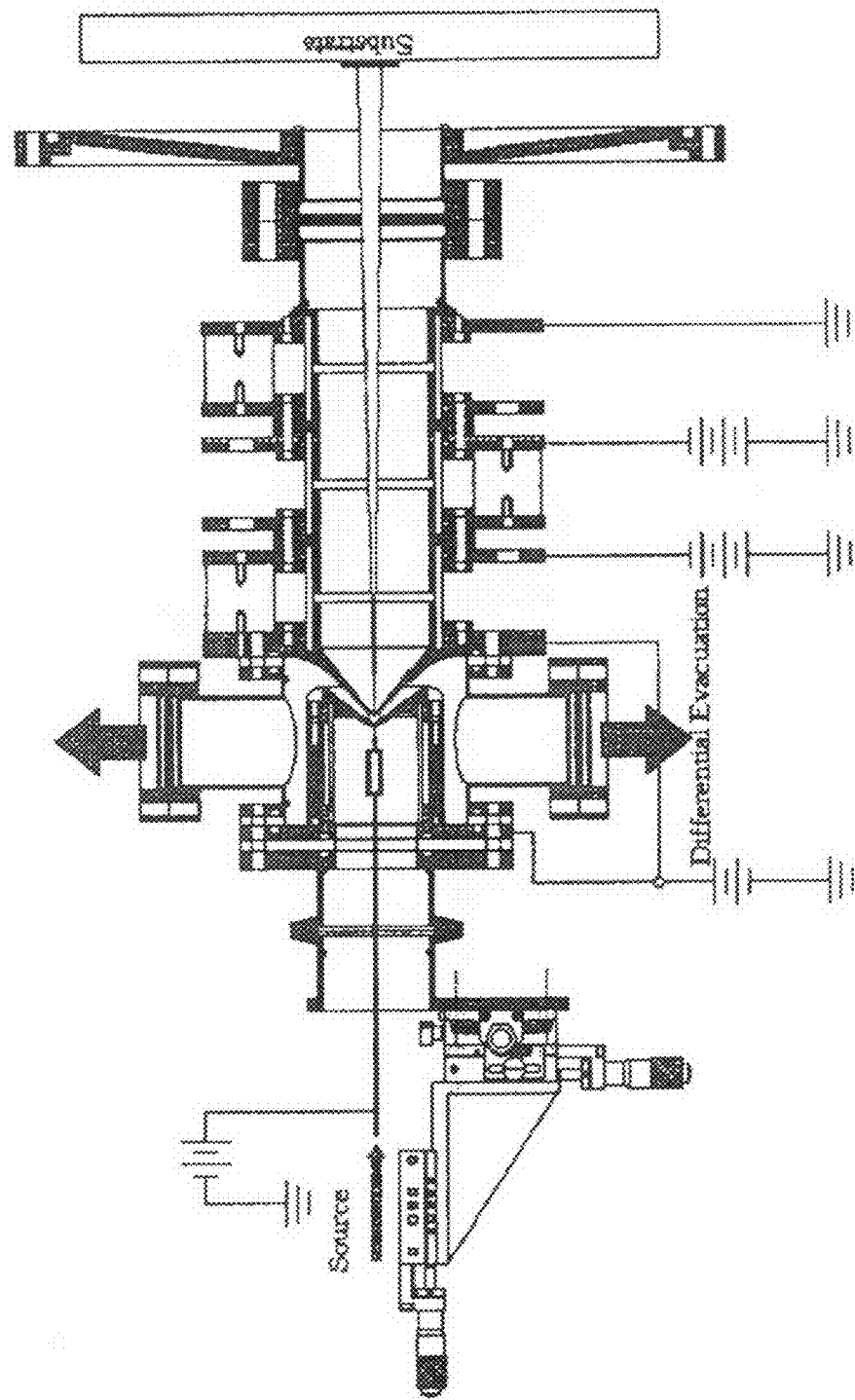
[FIG. 13] is a schematic view of an apparatus used in the invention.
Figure 14:
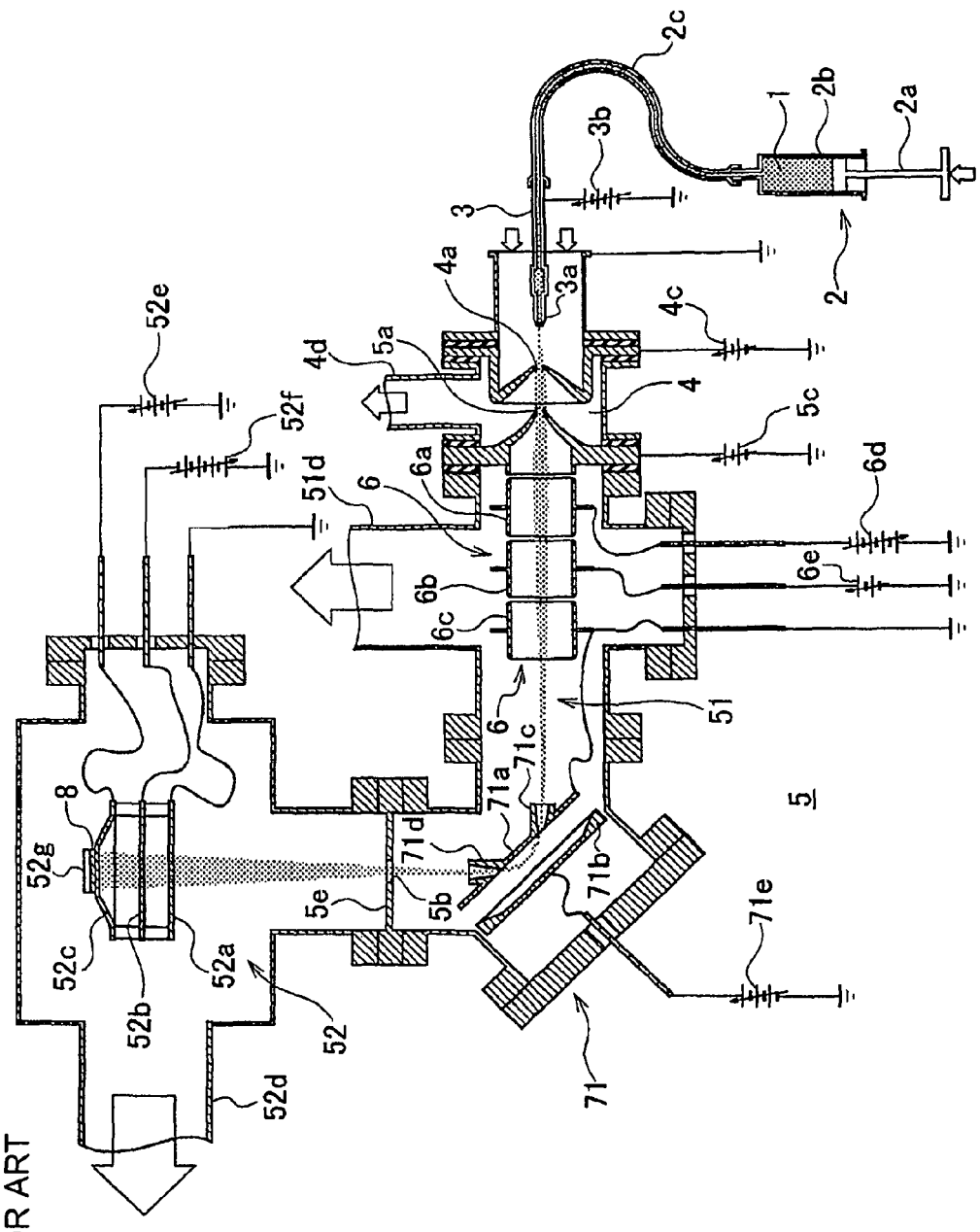
[FIG. 14] is a schematic view of an apparatus used in the invention.

The invention claimed is:

1. A quantum dot inorganic electroluminescent (EL) device comprising:
   a substrate,
   a first electrode,
   at least one insulating layer comprising at least one kind of compound selected from a group consisting of silicon nitride, tantalum oxide, silicon oxide, yttrium oxide, alumina, hafnium oxide, and barium tantalum oxide,
   a light-emission layer, and
   a second electrode, wherein
   said light-emission layer contains quantum dots (QD) and carbon (C),
   a ratio (NC/NQD) between the number of carbon atoms (NC) and the number of quantum dot constituent atoms (NQD) ranges from 0.00005 to 5,
   said light-emission layer is provided in contact with said insulating layer, and
   alternating current is applied to the quantum dot inorganic electroluminescent (EL) device.

2. The quantum dot inorganic EL device according to claim 1, wherein a solution of quantum dots, modified with an organic compound on the surface thereof and dispersed in a solvent, is used as a starting material for said quantum dots.

3. The quantum dot inorganic EL device according to claim 1, wherein said device has a first insulating layer and a second insulating layer, and said light-emission layer is provided between said first insulating layer and said second insulating layer in contact therewith.

4. The quantum dot inorganic EL device according to claim 1, wherein said quantum dots have a core/shell structure.

5. The quantum dot inorganic EL device according to claim 1, wherein said light-emission layer contains a polycrystal whose crystallites are made of quantum dots each having a core/shell structure.

6. The quantum dot inorganic EL device according to claim 1, wherein said light-emission layer is constituted of a buffer layer made of an inorganic semiconductor material and said quantum dots.

7. The quantum dot inorganic EL device according claim 1, wherein said light-emission layer is constituted of said quantum dots bonded as included in a buffer layer made of an inorganic semiconductor material.

8. The quantum dot inorganic EL device according to claim 1, wherein said quantum dots are deposited by an electrospray-ion beam deposition method.

9. The quantum dot inorganic EL device according to claim 1 wherein a second insulating layer and said second electrode are successively built up on said light-emission layer, wherein said second insulating layer and said second electrode are both transparent in a visible light region.

10. The quantum dot inorganic EL device according to claim 1 wherein said first electrode and said first insulating layer are successively built up on said substrate, wherein said substrate, said first electrode and said first insulating layer are, respectively, transparent in the visible light region.

11. A quantum dot inorganic electroluminescent (EL) device comprising:
    a substrate,
    a first electrode,
    at least one insulating layer comprising at least one kind of compound selected from a group consisting of silicon nitride, tantalum oxide, silicon oxide, yttrium oxide, alumina, hafnium oxide, and barium tantalum oxide,
    a light-emission layer, and
    a second electrode, wherein
    said light-emission layer contains quantum dots formed by using, as a starting material, a solution of quantum dots in which the quantum dots are dispersed in a solvent, the quantum dots having a surface modified with an organic compound,
    said light-emission layer is provided in contact with said insulating layer, and
    alternating current is applied to the quantum dot inorganic electroluminescent (EL) device.

* * * * *